United States Patent
Tenny et al.

(10) Patent No.: US 10,225,796 B2
(45) Date of Patent: Mar. 5, 2019

(54) SYSTEM AND METHOD FOR PAGING IN A COMMUNICATIONS SYSTEM

(71) Applicant: Futurewei Technologies, Inc., Plano, TX (US)

(72) Inventors: Nathan Edward Tenny, Poway, CA (US); Xiaoyan Duan, Shenzhen (CN); Hui Jin, Shenzhen (CN); Guorong Li, Beijing (CN); Guowei Ouyang, Beijing (CN); Yunsong Yang, San Diego, CA (US)

(73) Assignee: FUTUREWEI TECHNOLOGIES, INC., Plano, TX (US)

( * ) Notice: Subject to any disclaimer, the term of this patent is extended or adjusted under 35 U.S.C. 154(b) by 0 days.

(21) Appl. No.: 15/605,360

(22) Filed: May 25, 2017

(65) Prior Publication Data

US 2018/0007626 A1 Jan. 4, 2018

Related U.S. Application Data

(60) Provisional application No. 62/349,431, filed on Jun. 13, 2016.

(51) Int. Cl.
*H04W 48/16* (2009.01)
*H04W 48/20* (2009.01)
(Continued)

(52) U.S. Cl.
CPC .......... *H04W 48/20* (2013.01); *H04W 48/16* (2013.01); *H04W 68/02* (2013.01); *H04W 68/12* (2013.01);
(Continued)

(58) Field of Classification Search
CPC . H04W 60/06; H04W 72/042; H04W 74/006; H04W 28/18; H04W 36/04;
(Continued)

(56) References Cited

U.S. PATENT DOCUMENTS

| | | | |
|---|---|---|---|
| 7,957,352 B2 | 6/2011 | Vanghi et al. | |
| 8,289,954 B2 | 10/2012 | Tenny et al. | |

(Continued)

FOREIGN PATENT DOCUMENTS

| | | |
|---|---|---|
| CN | 105122914 A | 12/2015 |
| CN | 105557018 A | 5/2016 |
| WO | 2015034195 A1 | 3/2015 |

OTHER PUBLICATIONS

"3rd Generation Partnership Project; Technical Specification Group Services and System Aspects; General Packet Radio Service (GPRS) enhancements for Evolved Universal Terrestrial Radio Access Network (E-UTRAN) access (Release 13)," 3GPP TS 23.401 V13.6.1, Technical Specification, Mar. 2016, 365 pages.

(Continued)

*Primary Examiner* — Kwasi Karikari
(74) *Attorney, Agent, or Firm* — Slater Matsil, LLP

(57) ABSTRACT

A method for paging a user equipment (UE) includes receiving a generic page indication for the UE, the generic page indication including a list of radio access networks (RANs), selecting a subset of the list of RANs, sending a RAN-specific page indication for each RAN in the subset of the list of RANs, receiving a first RAN-specific page response associated with the UE, and sending a generic page response corresponding to the first RAN-specific page response.

21 Claims, 14 Drawing Sheets

(51) Int. Cl.
  *H04W 68/02* (2009.01)
  *H04W 68/12* (2009.01)
  H04W 72/04 (2009.01)
  H04W 74/02 (2009.01)

(52) U.S. Cl.
  CPC ........ *H04W 72/0406* (2013.01); *H04W 74/02* (2013.01)

(58) Field of Classification Search
  CPC ....... H04W 8/24; H04W 36/08; H04W 48/16; H04W 52/0206; H04W 60/02; H04W 72/1289; H04W 28/0289; H04W 28/08; H04W 36/00; H04W 36/001
  See application file for complete search history.

(56) References Cited

U.S. PATENT DOCUMENTS

| | | | | |
|---|---|---|---|---|
| 2007/0259675 A1* | 11/2007 | Worrall | ................ | H04W 68/00 455/458 |
| 2008/0009291 A1* | 1/2008 | Emberson | ............. | H04W 8/186 455/437 |
| 2014/0213277 A1 | 7/2014 | Jang | | |
| 2014/0302880 A1 | 10/2014 | Godin et al. | | |
| 2015/0063166 A1 | 3/2015 | Sif et al. | | |
| 2015/0181459 A1 | 6/2015 | Zhu | | |
| 2015/0282058 A1 | 10/2015 | Forssell | | |
| 2016/0057724 A1 | 2/2016 | Horn et al. | | |
| 2016/0057729 A1* | 2/2016 | Horn | ..................... | H04W 48/18 455/458 |
| 2016/0234672 A1 | 8/2016 | Cho et al. | | |
| 2016/0309448 A1* | 10/2016 | Truelove | ............... | H04W 68/04 |

OTHER PUBLICATIONS

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 13)," 3GPP TS 36.300, V13.10, Mar. 2016, 295 pages.

"Cross Paging Architecture Proposal", 3rd Generation Partnership Project 2, Los Angeles, CA, Jul. 19, 2004, 3 pages.

"3rd Generation Partnership Project; Technical Specification Group Services and System Aspects; Study on Architecture for Next Generation System (Release 14)," Technical Report, 3GPP TR 23.799 V0.4.0, Apr. 2016, 96 pages.

* cited by examiner

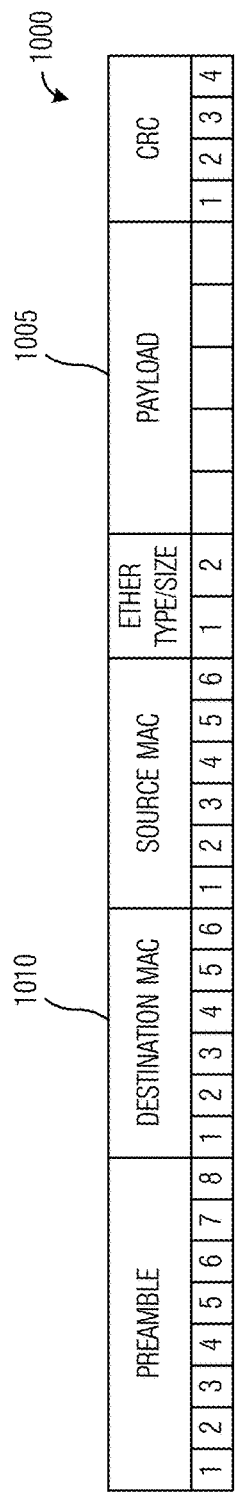
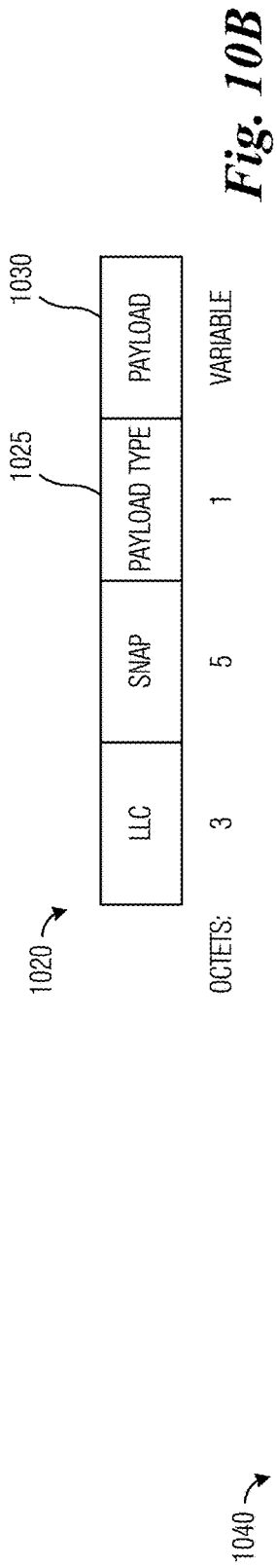

SYSTEM AND METHOD FOR PAGING IN A COMMUNICATIONS SYSTEM

This application claims the benefit of U.S. Provisional Application No. 62/349,431, filed on Jun. 13, 2016, entitled "System and Method for Paging in a Virtualized Network," which application is hereby incorporated herein by reference.

TECHNICAL FIELD

The present disclosure relates generally to a system and method for digital communications, and, in particular embodiments, to a system and method for paging in a communications system.

BACKGROUND

Generally, in traditional cellular networks, the point where a mobile device attaches and where mobility is controlled is a mobility control node of the core network. As an example, in a Third Generation Partnership Project (3GPP) Long Term Evolution (LTE) compliant network, the node is referred to as a mobility management entity (MME). Each mobility control node has control of the mobile devices within a particular domain, as well as the responsibility for locating the mobile devices and establishing connectivity when communications is needed, such as paging the mobile devices when data service with the mobile device is needed.

Because the mobility control nodes belong to a particular core network, they are intrinsically coupled to the radio access technology (RAT) or technologies (RATs) used in radio access networks (RANs) coupled to that core network. Traditionally, these coupling relationships between RANs and core network nodes have been RAT-specific, with a core network having only one RAT (or at most, a small number of closely related RATs) with which it can communicate. As an example, a MME is specific to mobile devices using 3GPP LTE access. Communicating with devices using other access technologies requires special purpose interworking procedures between the respective core networks, and in general, a particular mobile device would still be associated with one radio access technology or another. For example, a 3GPP LTE network may communicate with a CDMA2000 network to perform an inter-RAT handover, but after the handover, the 3GPP LTE MME considers that the mobile device is no longer under the coverage of the 3GPP LTE MME.

In future networks, using software defined network (SDN) architecture and/or virtualized network functions, the mobility control node will be replaced by a logical function, typically hosted in an Internet protocol (IP) cloud. The virtualized function has no special reason to communicate with only one RAT, and it is reasonable that a single mobility control function may manage devices using multiple RATs.

SUMMARY

Example embodiments provide a system and method for paging in a communications system.

In accordance with an example embodiment, a method for paging a user equipment (UE) is provided. The method includes receiving, by an adaptation function, a generic page indication for the UE, the generic page indication including a list of radio access networks (RANs), selecting, by the adaptation function, a subset of the list of RANs, sending, by the adaptation function, a RAN-specific page indication for each RAN in the subset of the list of RANs, receiving, by the adaptation function, a first RAN-specific page response associated with the UE, and sending, by the adaptation function, a generic page response corresponding to the first RAN-specific page response.

Optionally, in any of the preceding embodiments, wherein at least two RANs in the list of RANs operate using distinct radio access technologies (RATs).

Optionally, in any of the preceding embodiments, wherein the adaptation function receives a plurality of RAN-specific page responses including the first RAN-specific page response associated with the UE, and wherein the method further comprises selecting, by the adaptation function, the first RAN-specific page response from the plurality of RAN-specific page responses in accordance with a selection criteria.

Optionally, in any of the preceding embodiments, wherein the selection criteria includes at least one of a preferred RAN for a service being setup by the generic page indication, a preferred RAN for the UE, RAN capabilities, UE capabilities, RAN condition, or UE condition.

Optionally, in any of the preceding embodiments, wherein the generic page indication is associated with a service with a preferred RAN, and wherein the subset of the list of RANs is selected in accordance with the preferred RAN.

Optionally, in any of the preceding embodiments, wherein at least one of the RAN-specific page indications include information to direct the UE to the preferred RAN.

Optionally, in any of the preceding embodiments, wherein at least a first RAN-specific page indication of the RAN-specific page indications includes a data frame encapsulating a second RAN-specific page indication associated with the preferred RAN or RAN-specific information associated with the preferred RAN.

Optionally, in any of the preceding embodiments, wherein the adaptation function receives a plurality of RAN-specific page responses including the first RAN-specific page response associated with the UE, and wherein the method further comprises sending, by the adaptation function, to RAN devices associated with the plurality of RAN-specific page responses other than the first RAN-specific page response, RAN-specific messages indicating the RAN devices to release the UE.

In accordance with an example embodiment, a method for operating a UE is provided. The method includes receiving, by the UE, a first RAN-specific page indication from a first RAN device, the first RAN-specific page indication including information regarding a preferred RAN, sending, by the UE, a RAN-specific page response to a second RAN device, and participating, by the UE, in a RAN change in accordance with the first RAN-specific page indication.

Optionally, in any of the preceding embodiments, wherein the first RAN-specific page indication includes a redirection indicator, and wherein participating in the RAN change comprises redirecting to the preferred RAN.

Optionally, in any of the preceding embodiments, wherein the first RAN-specific page indication includes a handover indicator, and wherein participating in the RAN change comprises performing a handover to the preferred RAN.

Optionally, in any of the preceding embodiments, wherein the first RAN device and the second RAN device are one and the same.

Optionally, in any of the preceding embodiments, wherein the first RAN device and the second RAN device are different RAN devices, wherein the second RAN device serves the preferred RAN, and wherein the first RAN-specific page indication from the first RAN device encapsulates a second RAN-specific page indication associated with the preferred RAN or RAN-specific information associated with the preferred RAN.

Optionally, in any of the preceding embodiments, wherein the first RAN-specific page indication comprises a logical link control (LLC) Protocol Discrimination (LPD) based data frame with an EtherType field indicating that the LPD based data frame is an EtherType "89-0d" frame, wherein the second RAN-specific page indication or the RAN-specific information associated with the preferred RAN is encapsulated in a payload of the LPD based data frame, and wherein a payload type indicator of the LPD based data frame indicates a paging protocol of the preferred RAN, the method further comprising obtaining, by the UE, the payload type indicator and the payload of the LPD based data frame from the first RAN-specific page indication, and forwarding, by the UE, the payload to a UE protocol stack associated with the preferred RAN based on a value of the payload type indicator, wherein the UE protocol stack associated with the preferred RAN generates the RAN-specific page response.

In accordance with an example embodiment, a method for paging a UE is provided. The method includes receiving, by a first RAN device serving a first RAN, a first RAN-specific page indication for the UE, determining, by the first RAN device, that the UE is camped on a second RAN, sending, by the first RAN device, a second RAN-specific page indication to a second RAN device serving the second RAN, the second RAN-specific page indication including a RAN-specific paging message, and receiving, by the first RAN device, a first RAN-specific page response from the UE.

Optionally, in any of the preceding embodiments, wherein the RAN-specific paging message is encapsulated in the second RAN-specific page indication.

Optionally, in any of the preceding embodiments, wherein the second RAN-specific page indication comprises a data frame.

Optionally, in any of the preceding embodiments, further comprising forwarding, by the first RAN device, the first RAN-specific page response from the UE to an adaptation function, wherein the first RAN-specific page indication for the UE is received from the adaptation function.

In accordance with an example embodiment, a UE is provided. The UE includes one or more processors, and a computer readable storage medium storing programming for execution by the one or more processors. The programming including instructions to configure the UE to receive a first RAN-specific page indication from a first RAN device, the first RAN-specific page indication including information regarding a preferred RAN, send a RAN-specific page response to a second RAN device, and participate in a RAN change in accordance with the first RAN-specific page indication.

Optionally, in any of the preceding embodiments, wherein the first RAN-specific page indication includes a redirection indicator, and wherein the programming includes instructions to configure the UE to redirect to the preferred RAN.

Optionally, in any of the preceding embodiments, wherein the first RAN-specific page indication includes a handover indicator, and wherein the programming includes instructions to configure the UE to perform a handover to the preferred RAN.

Practice of the foregoing embodiments enables the paging of a mobile device when the mobility management function does not know where (e.g., in which one of a plurality of RATs) to locate the mobile device.

BRIEF DESCRIPTION OF THE DRAWINGS

For a more complete understanding of the present disclosure, and the advantages thereof, reference is now made to the following descriptions taken in conjunction with the accompanying drawings, in which:

FIG. 10A illustrates an example Ethernet frame;

FIG. 10B illustrates an example LLC Protocol Discrimination based data frame;

FIG. 10C illustrates a table of example Payload Type values;

DETAILED DESCRIPTION OF ILLUSTRATIVE EMBODIMENTS

Figure 1:
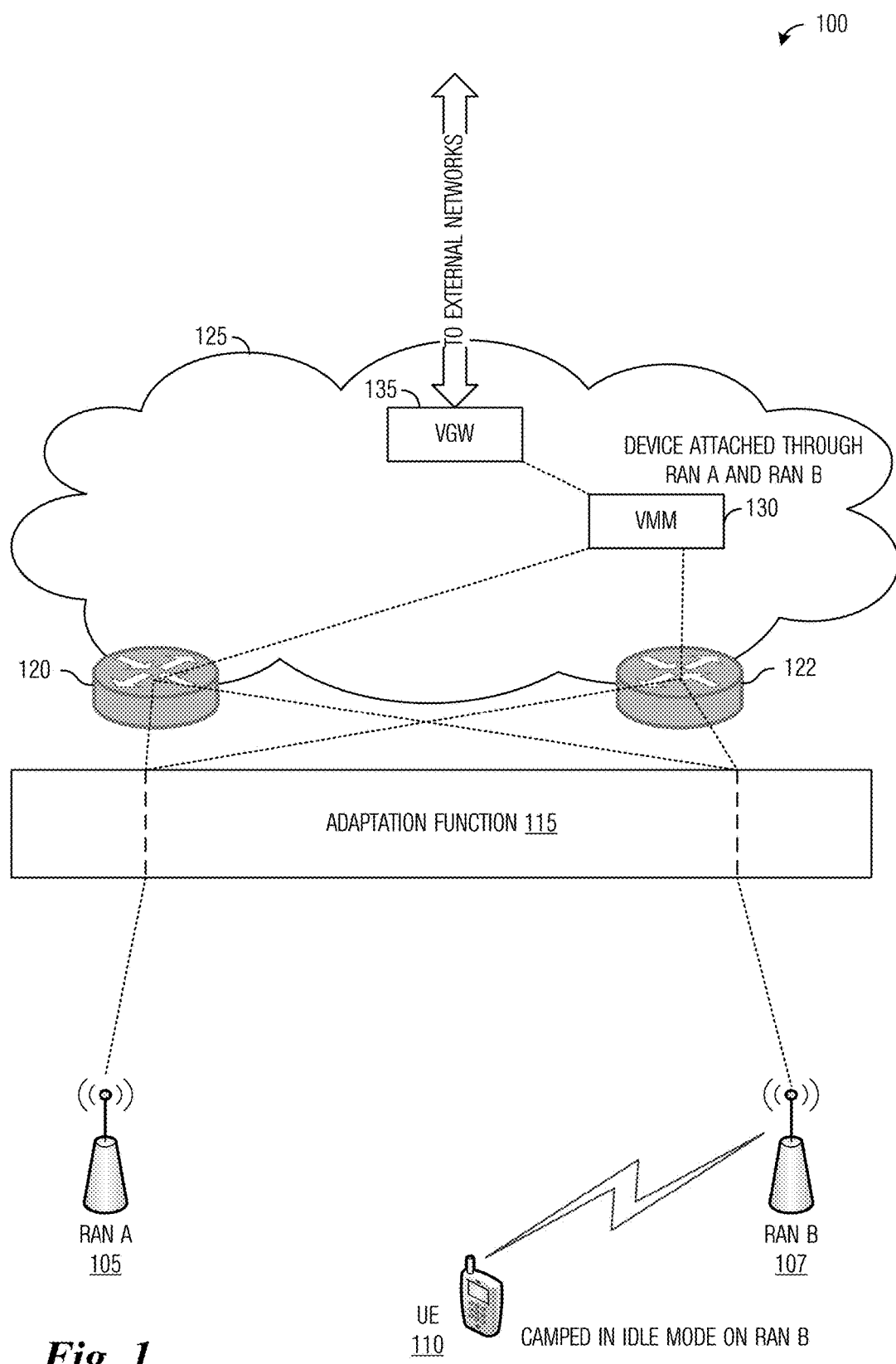
FIG. 1 is an example communications system according to example embodiments described herein.

The making and using of the presently example embodiments are discussed in detail below. It should be appreciated, however, that the present disclosure provides many applicable inventive concepts that can be embodied in a wide variety of specific contexts. The specific embodiments discussed are merely illustrative of specific ways to make and use the embodiments, and do not limit the scope of the disclosure.

The embodiments will be described with respect to example embodiments in a specific context, namely networks that use a mobility control function to manage mobile devices using multiple radio access technologies (RATs). The embodiments may be applied to standards compliant communications systems and non-standards compliant communications systems that use a mobility control function to manage mobile devices using multiple RATs.

In a virtualized network, it makes sense to abstract the concept of device attachment, so that the service layer has no special dependency on a particular access network. As an example, a high-speed data service needs to know that the serving network can provide a requisite data rate to the mobile device, but there is no need to distinguish between the networks that provide the needed data rate using the Third Generation Partnership Project (3GPP) Long Term Evolution (LTE) or Institute of Electrical and Electronics Engineers (IEEE) 802.11 (commonly referred to as Wi-Fi or wireless local area network (WLAN)) or some other RAT. The abstraction may be referred to as a "network as a service" (NaaS) concept and is a major use case for the network function virtualization concept. The NaaS concept is seen as enabling a high level of future flexibility in integrating different RATs in order to provide a seamless user experience.

A mobile device may be attached to the mobility management function through any RAT, e.g., a first RAT. The mobile device may subsequently move to a different RAT, e.g., a second RAT, through an inter-RAT handover, for example. In addition, some devices may be able to attach through several RATs at the same time, with a particular service being delivered using whichever radio access network (RAN) that can best support the requirements (e.g., voice services using a cellular RAN and data services using a Wi-Fi RAN). In these environments, the mobility management function may not know which RAN is serving the mobile device at any particular moment, especially if the mobile device is camped in an idle mode on the RANs. In a situation where the battery life of a mobile device is a major concern, a significant advantage may be to minimize signaling between the mobile device and the network infrastructure when the mobile device is in an idle mode, even as the mobile device moves between regions where the different regions may have preferred coverage from different RANs (e.g., due to variations in radio environments). Minimizing signaling would allow the mobile device to benefit from moving freely between RANs without any explicit signaling to update the mobility management function. Therefore, when there is a need to make contact with the mobile device in the idle mode (e.g., paging for a mobile device terminated service), it cannot always be assumed that the mobility management function knows where (e.g., via which RAN) to locate the mobile device.

FIG. 1 illustrates an example communications system 100. Communications system 100 includes a first RAN (RAN_A) 105 and a second RAN (RAN_B) 107. Communications system 100 also includes a user equipment (UE) 110 that is camped in RAN_B 107, and is in an idle mode, which means that UE 110 is not actively participating in communications. The two RANs are connected to an adaptation function 115 that abstracts RAN functions into a form similar to an application programming interface (API) for a software defined network (SDN). Adaptation function 115 may not be necessary within 3GPP compliant RATs but provides flexibility with other RATs. Adaptation function 115 may be implemented in an entity in the core network. Alternatively, adaptation function 115 may be implemented in a stand-alone device, as a distributed function in multiple network devices, and so on. Adaptation function 115 is informed regarding paging message formats used in the different RATs, for example.

The API is provided to routers 120 and 122 that interface with a SDN 125. In SDN 125, there are virtualized mobility functions (VMM) 130 and virtualized gateway functions (VGW) 135. VMM 130 controls devices attached through RAN_A 105 and RAN_B 107, while VGW 135 provides connectivity to external networks. It should be appreciated that VMM 130 and VGW 135 may be instantiated on a single hardware entity, on separate hardware entities, in a centralized or distributed fashion, etc., depending on the architecture of SDN 125.

While it is understood that communications systems may employ multiple routers, RANs, and UEs, in various network topologies, only two routers, two RANs, and one UE are illustrated for simplicity.

SDN 125 communicates with RAN_A 105 and RAN_B 107. As an example, RAN_A 105 may be 3GPP LTE compliant while RAN_B 107 is a fifth generation (5G) compliant RAT. Communications with non-3GPP and pre-fourth generation (pre-4G) RATs are also possible.

UE 110 has one registration that covers both RANs and the registration is not updated each time UE 110 switches RANs. In state of the art communications systems, when a UE is registered with the core network, and in idle mode "somewhere" (i.e., camped in the coverage of one of the RANs (RAN_A 105 or RAN_B 107)), VMM 130 does not know which RAN the UE is camped in. This uncertainty leads to the question, how does SDN 125 page UE 110 to set up a service?

Figure 2:
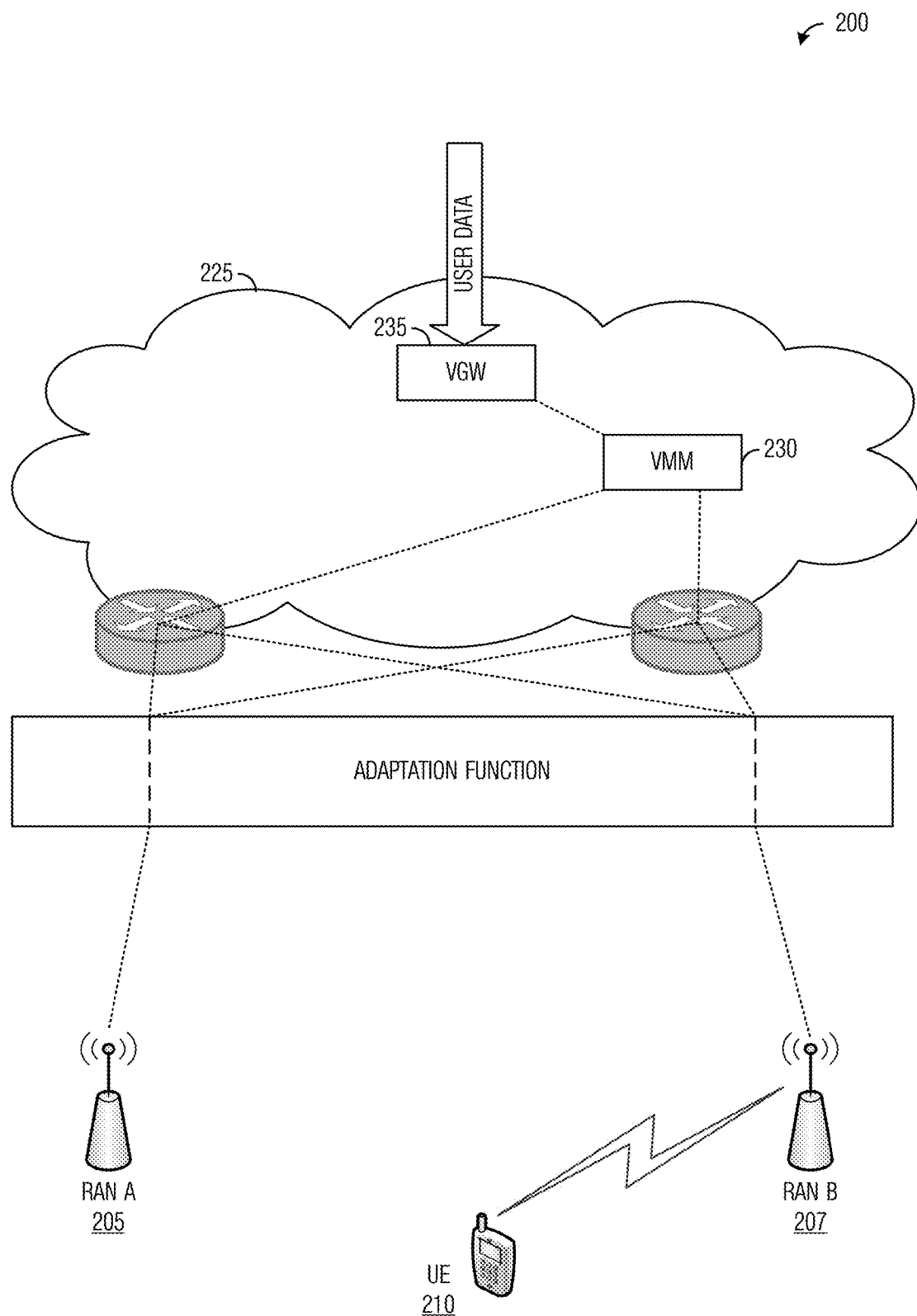
FIG. 2 is an example communications system, highlighting the processing of data intended for a UE arriving at an SDN according to example embodiments described herein.

FIG. 2 illustrates an example communications system 200, highlighting the processing of data intended for a UE 210 arriving at an SDN 225. In general, when data arrives at SDN 225 for UE 210, a route is needed by a VGW 235 to deliver the data to UE 210. A VMM 230 has a context for UE 210 but no active route to UE 210. VMM 230 is responsible for paging UE 210 to establish a radio resource control (RRC) connection with UE 210 to provide the route to VGW 235. However, VMM 230 does not know if UE 210 is camped on RAN_A 205 or RAN_B 207, therefore, VMM 230 does not know if it should page RAN_A 205 or RAN_B 207. A potentially easy solution would be to page both RAN_A 205 and RAN_B 207, which is commonly referred to as flood paging.

Figure 3:
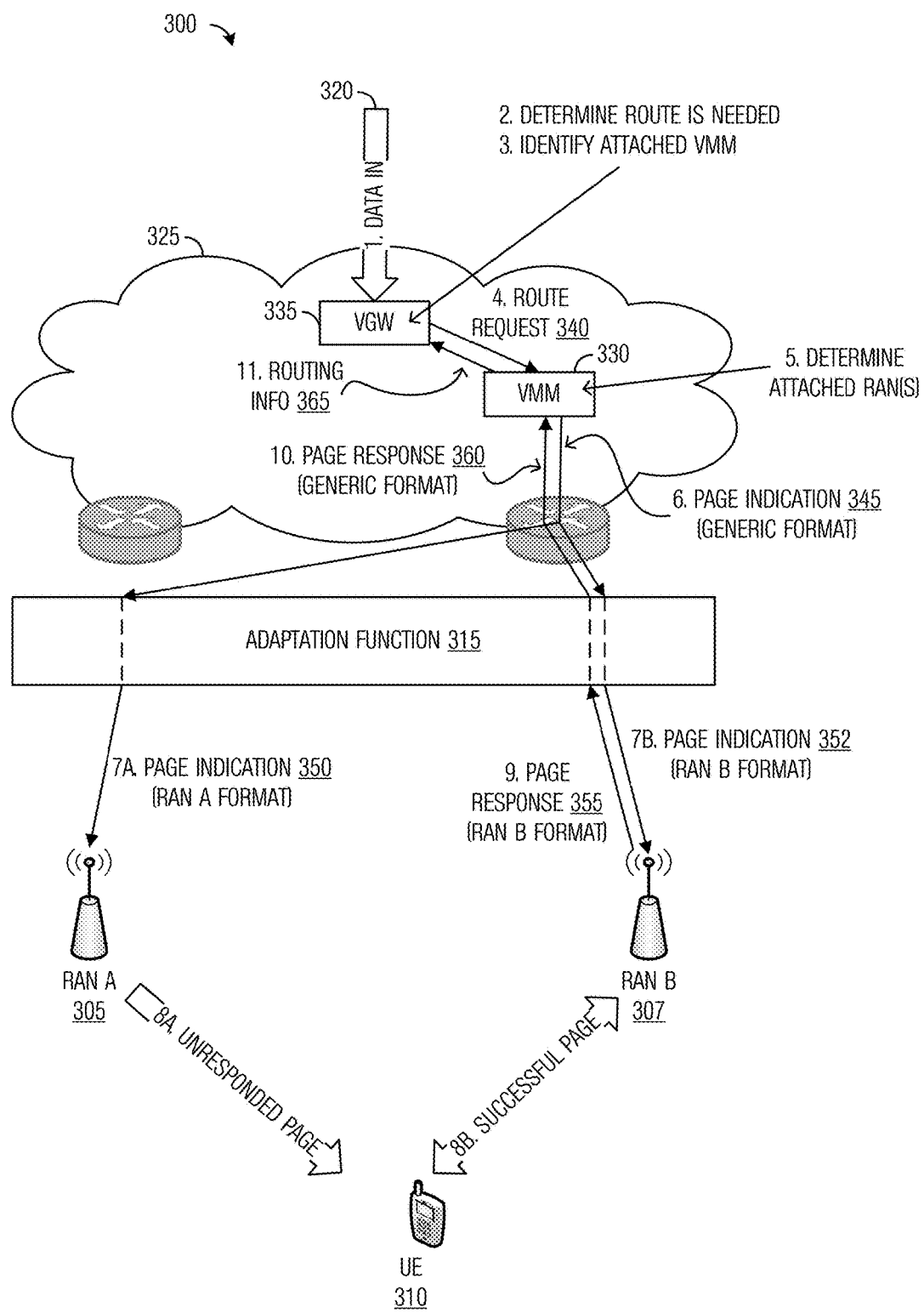
FIG. 3 is an example communications system, highlighting the paging procedure according to example embodiments described herein.

FIG. 3 illustrates an example communications system 300, highlighting the paging procedure. Communications system 300 includes a RAN_A 305 and a RAN_B 307 with a UE 310 camped in RAN_B 307 but in an idle mode. The two RANs are connected to an adaptation function 315, which is connected to an SDN 325. In SDN 325, there is a VMM 330 and a VGW 335.

At event 320, data arrives at SDN 325 for delivery to UE 310. VGW 335 determines that a route is needed to get the data to UE 310, as well as identifies a VMM (e.g., VMM 330) to which UE 310 is attached. VGW 335 sends a route request 340 to VMM 330. VMM 330 determines one or more RANs on which UE 310 may be camped. In the scenario illustrated in FIG. 3, historical information (e.g., serving RAT information at the time UE 310 became attached to VMM 330) may indicate that UE 310 has been served by RAN_A 305 and RAN_B 307. Alternatively, UE 310 may have been configured, while served by one of RAN_A 305 and RAN_B 307, to move freely between RAN_A 305 and RAN_B 307 without needing to update its attachment status with the network. In either case, VMM 330 does not know on which RAN UE 310 is currently camped.

VMM 330 sends a page indication 345 to adaptation function 315. Page indication 345 may be in a generic format, meaning that page indication 345 is not formatted for any particular RAN. In an embodiment, adaptation function 315 accepts generic page indications and generates page indications in RAN specific formats. Adaptation function 315 also translates page responses in a RAN specific format into a generic page response. Adaptation function 315 generates two page indications (one for each of the two RANs) with a first page indication 350 in a format compatible with RAN_A 305 and a second page indication 352 in a format compatible with RAN_B 307. RAN_A 305 and RAN_B 307 transmit pages but only the page from RAN_B 307 is successful (meaning that a corresponding page response is received from UE 310) because UE 310 is currently camped in RAN_B 307. RAN_B 307 sends a page response 355 to adaptation function 315 in a format compatible with RAN_B 307. Adaptation function 315 converts page response 355 into a page response 360 that is in a generic format and sends page response 360 to VMM 330. VMM 330 generates routing information 365 in accordance with information in page response 360 and sends routing information 365 to VGW 335.

According to an example embodiment, in a situation where a page indication for a UE that may be camped in a plurality of RANs is received, pages are sent in each RAN in the plurality of RANs. The paging of the UE in multiple RANs is commonly referred to as flood paging.

According to an example embodiment, in a situation where a page indication for a UE that may be camped in a plurality of RANs is received, a subset of the plurality of RANs is selected and a page is sent to the UE using each RAN in the subset of the plurality of RANs. The page sent in a particular RAN is in a format compatible with the RAN.

Figure 4:
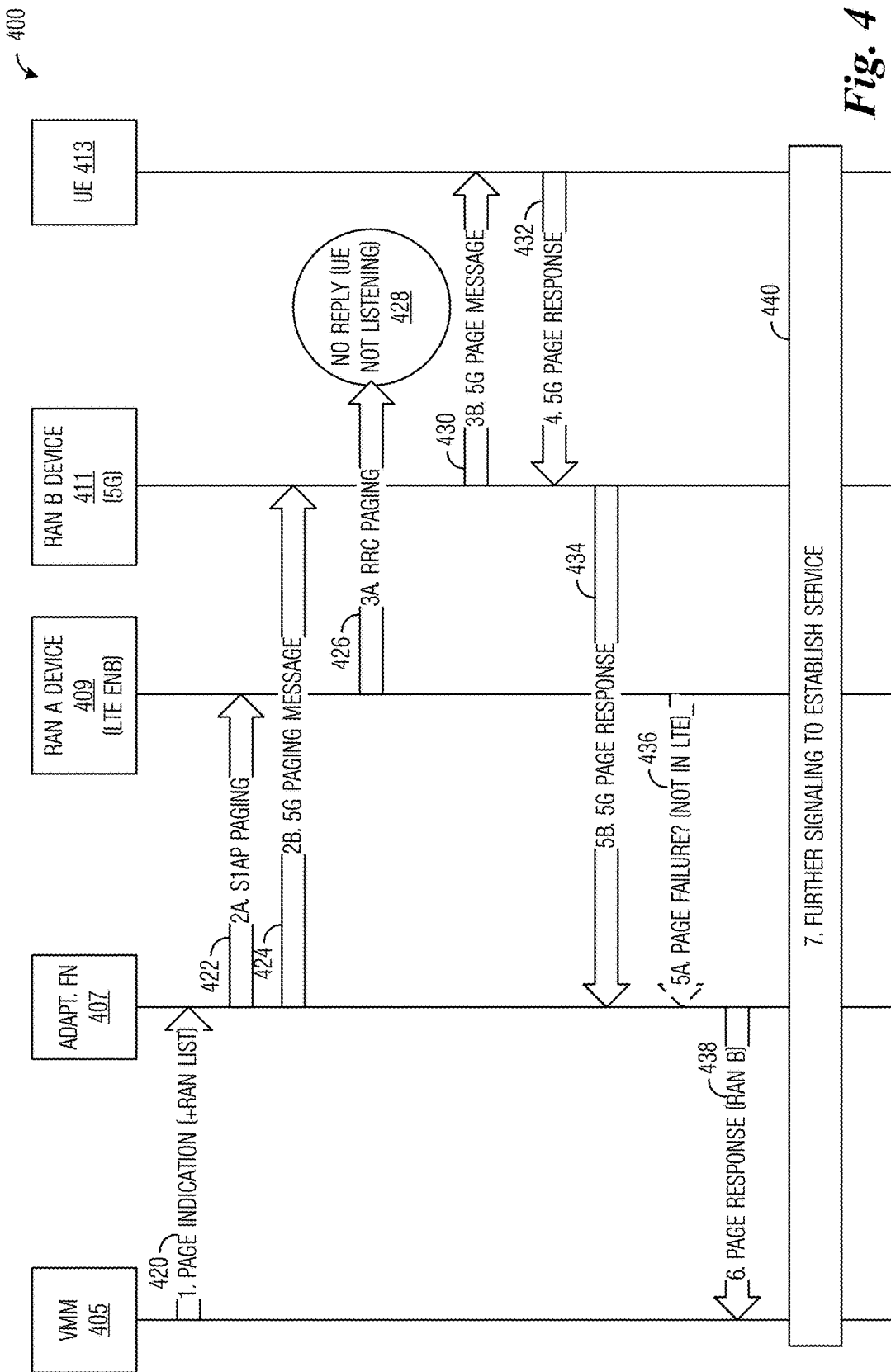
FIG. 4 illustrates a diagram highlighting messages exchanged and processing performed by devices participating in flood paging according to example embodiments described herein.

FIG. 4 illustrates a diagram 400 highlighting messages exchanged and processing performed by devices participating in flood paging. Diagram 400 highlights messages exchanged and processing performed by a VMM 405, an adaptation function 407, a RAN_A device 409, a RAN_B device 411, and a UE 413. Adaptation function 407 may be implemented in an entity in the core network. Alternatively, adaptation function 407 may be implemented in a stand-alone device, as a distributed function in multiple network devices, and so on.

VMM 405 sends a page indication to adaptation function 407 (event 420). Page indication is in a generic format and may include a RAN list. The RAN list comprises a list of RANs that have served UE 413 in the past, or for which the attachment status of UE 413 in VMM 405 is otherwise valid. In general, the attachment status of a UE at a VMM comprises a list of RANs that may have served or may potentially serve the UE. The RAN list may be age limited, meaning that older RANs, i.e., RANs for which the UE's attachment status is less current, may not be listed. Adaptation function 407 generates page indications for each RAN in the RAN list, which in the scenario illustrated in FIG. 4, includes 2 RANs, RAN_A (which may be a 3GPP LTE compliant RAN) and RAN_B (which may be a 5G compliant RAN). The page indication for each RAN follows the format associated with the RAN. Adaptation function 407 sends the two page indications to the respective RANs (events 422 and 424).

RAN_A device 409, e.g., a 3GPP evolved NodeB (eNB), sends a radio resource control (RRC) page message (event 426) in accordance with the standard paging behavior of an eNB when the core network indicates a page. However, because UE 413 is not camped in RAN_A, there is no reply (circle 428). RAN_B device 411, e.g., a 5G device such as a next generation (NG) Node B (gNB), sends a 5G page message (event 430) in accordance with the paging (or equivalent functionality) procedures of the 5G RAN. UE 413 receives the 5G page and sends a 5G page response (event 432). RAN_B device 411 sends the 5G page response to adaptation function 407 (event 434). RAN_A device 409 may send a page failure to adaptation function 407 if RAN_A supports page failure messages (event 436). It is noted that 3GPP LTE does not support page failure messages. A page failure message may be useful to indicate to adaptation function 407 that a page indication failed to receive a response. In situations where a RAN does not support page failure messages (such as in 3GPP LTE compliant RANs), a time-out mechanism may be used to determine if the page indication did not receive a response, and to either retry the paging procedure or give up.

Adaptation function 407 converts the 5G page response into a generic page response and sends the generic page response to VMM 405 (event 438). Additional signaling is performed to establish service for UE 413 (block 440).

It is noted with flood paging that:
Although a response was received from a RAN, the RAN that responded may not provide the best access for the particular service being setup. This leads to suboptimal network capabilities, as an example, Wi-Fi may be used to setup a voice service. Alternatively, the RAN that responded may be more heavily loaded, leading to greater difficulty in meeting quality of service (QoS) requirements. Furthermore, there may be a preference (e.g., user) for a particular RAN to provide access for the particular service; and
More than one page response may be received. As an example, the UE may be a dual radio device, a dual SIM dual standby (DSDS) device, and so on. Therefore, in the worst case, the UE can respond to multiple page indications simultaneously. The RANs may or may not be informed about the simultaneous camping by the UE.

As an illustrative example, suppose that a service being setup prefers a first RAN (e.g., 3GPP LTE) over a second RAN (e.g., 5G). Furthermore, suppose that the VMM knows that the UE can use the first RAN, and that the UE's attachment to the core network would allow it to use the first RAN, but the VMM does not necessarily know on which RAN the UE is currently camped. Hence, it is desired that the UE be paged wherever the UE is camped, but it is also desired to move the UE into the first RAN to provide the service being setup, because the first RAN is the preferred RAN in this illustrative example. In this situation, there is a possibility that the UE is camped on the second RAN and receives paging on the second RAN, establishing a need to move the UE into service on the first RAN. In 3GPP LTE, a similar situation occurs in paging for circuit switched fallback (CSFB), where a goal is for the UE to end up on a circuit switched supporting RAT. As an example, redirection or handover may be used to move the UE into the first RAN. A similar effect could be achieved by so-called "cross-paging", where a page in a first RAN is used to page the UE with a direction to move immediately to a second RAN and to respond on the second RAN. However, cross-paging is not supported in 3GPP LTE today.

Figure 5:
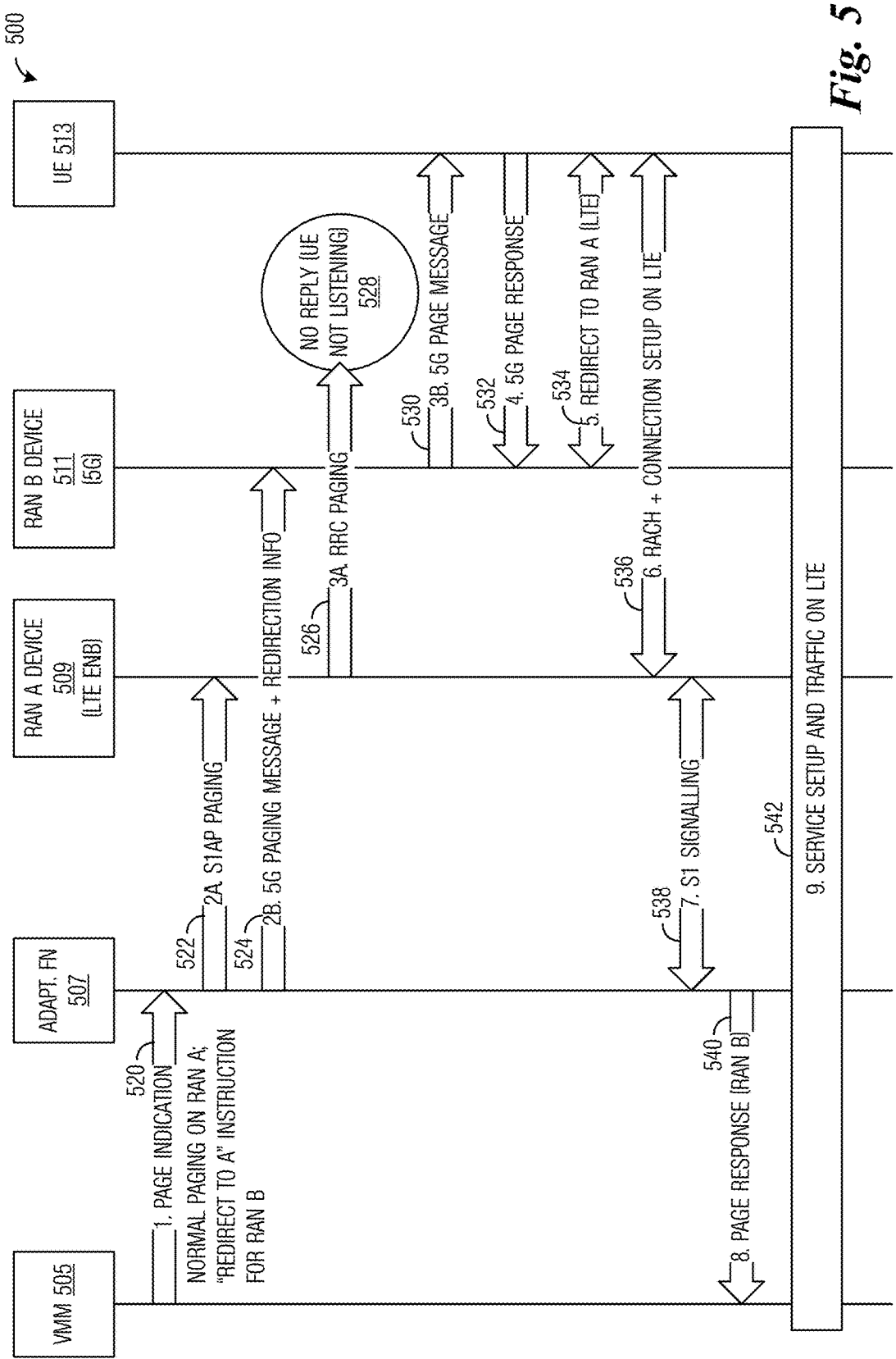
FIG. 5 illustrates a diagram highlighting messages exchanged and processing performed by devices participating in access selection using redirection according to example embodiments described herein.

FIG. 5 illustrates a diagram 500 highlighting messages exchanged and processing performed by devices participating in access selection using redirection. Diagram 500 highlights messages exchanged and processing performed by a VMM 505, an adaptation function 507, a RAN_A device 509 (e.g., an LTE eNB), a RAN_B device 511 (e.g., a 5G gNB), and a UE 513. Adaptation function 507 may be implemented in an entity in the core network. Alternatively, adaptation function 507 may be implemented in a stand-alone device, as a distributed function in multiple network devices, and so on.

VMM 505 sends a page indication to adaptation function 507 (event 520). Different page indications may be sent for different RANs, based on a preferred RAN for a service being setup. As an illustrative example, if RAN_A is the preferred RAN, then a normal page indication is sent for RAN_A and a redirect to RAN_A page indication is sent for RAN_B. Adaptation function 507 generates RAN specific page indications for the RANs. As an example, adaptation function 507 generates a 3GPP LTE SiAP paging message for RAN_A and a 5G paging message with redirection information for RAN_B. Adaptation function 507 sends the page indications to respective RANs (events 522 and 524).

RAN_A device 509 sends an RRC paging message (event 526) but UE 513 is not camped in RAN_A so there is no reply (circle 528). RAN_B device 511 sends a 5G page message (event 530). Because UE 513 is camped in RAN_B, UE 513 sends a 5G page response (event 532). UE 513 and RAN_B device 511 participate in a redirection to RAN_A (event 534). UE 513 participates in a random access channel (RACH) procedure and sets up a connection on RAN_A (event 536). RAN_A device 509 sends a page response, e.g., S1 signaling, to adaptation function 507 (event 538). Adaptation function 507 converts the page response in RAN_A format into a generic page response and sends the generic page response to VMM 505 (event 540). The devices continue with service setup and commence communications in RAN_A (block 542).

Figure 6:
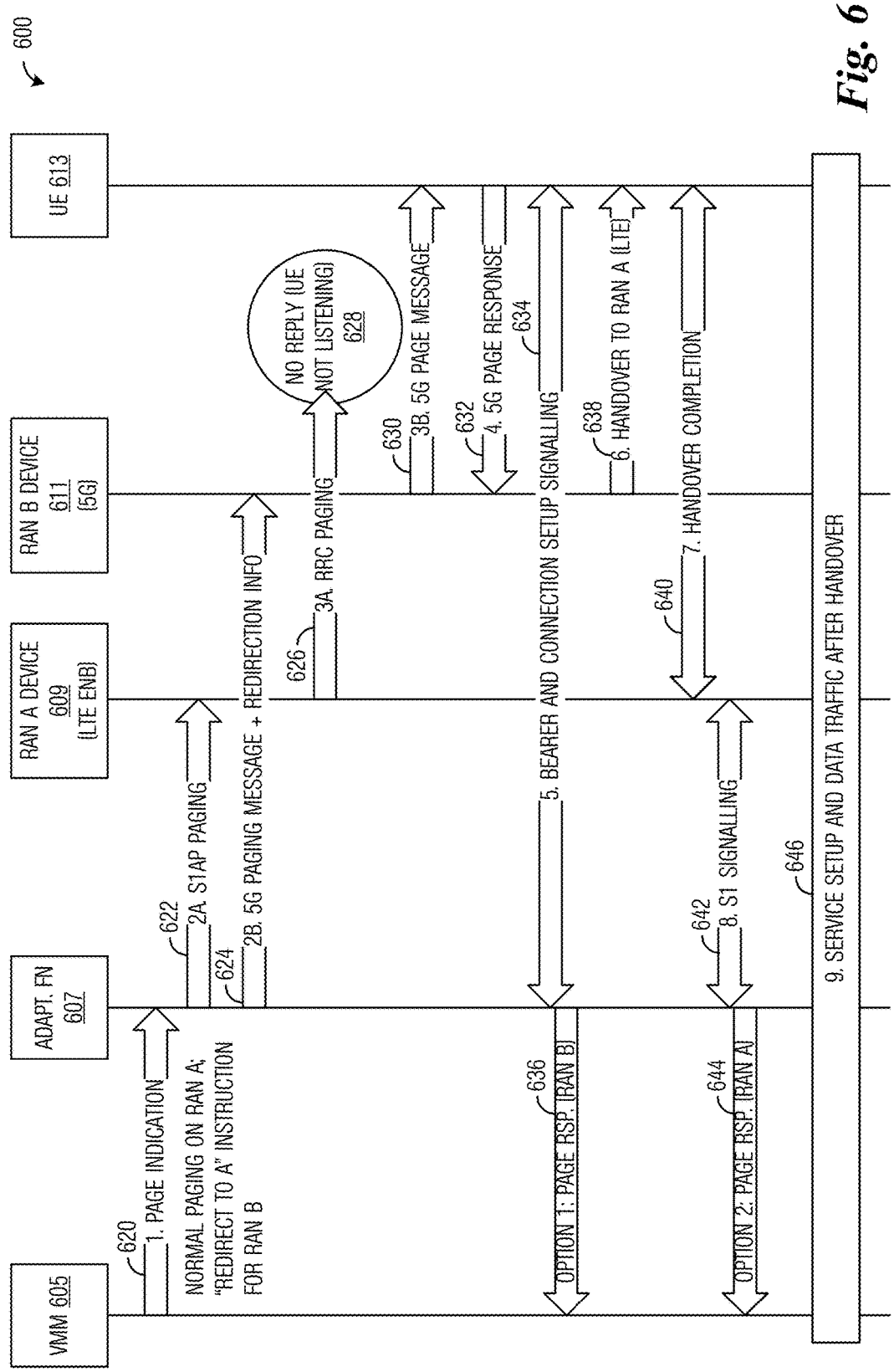
FIG. 6 illustrates a diagram highlighting messages exchanged and processing performed by devices participating in access selection using handover according to example embodiments described herein.

FIG. 6 illustrates a diagram 600 highlighting messages exchanged and processing performed by devices participating in access selection using handover. Diagram 600 highlights messages exchanged and processing performed by a VMM 605, an adaptation function 607, a RAN_A device 609 (e.g., an LTE eNB), a RAN_B device 611 (e.g., a 5G gNB), and a UE 613. Adaptation function 607 may be implemented in an entity in the core network. Alternatively, adaptation function 607 may be implemented in a stand-alone device, as a distributed function in multiple network devices, and so on.

VMM 605 sends a page indication to adaptation function 607 (event 620). Different page indications may be sent for different RANs, based on a preferred RAN for a service being setup. As an illustrative example, if RAN_A is the preferred RAN, then a normal page indication is sent for RAN_A and a redirect to RAN_A page indication is sent for RAN_B. Adaptation function 607 generates RAN specific page indications for the RANs. As an example, adaptation function 607 generates a 3GPP LTE SiAP paging message for RAN_A and a 5G paging message with redirection information for RAN_B. Adaptation function 607 sends the paging messages to respective RANs (events 622 and 624).

RAN_A device 609 sends an RRC paging message (event 626) but UE 613 is not camped in RAN_A so there is no reply (circle 628). RAN_B device 611 sends a 5G page message (event 630). Because UE 613 is camped in RAN_B, UE 613 sends a 5G page response (event 632). UE 613 and a plurality of network entities, including, e.g., adaptation function 607 that is serving as a proxy for core network entities, exchange signaling to perform bearer and connection setup (shown as a single event 634 to simplify FIG. 6). In a first option, adaptation function 607 sends a page response indication from UE 613 camped in RAN_B to VMM 605 to complete the paging of UE 613 (event 636).

RAN_B device 611 sends a handover message to UE 613 to initiate a handover to RAN_A (event 638). UE 613 and RAN_A device 609 exchange messages to complete the handover (event 640). RAN_A device 609 signals adaptation function 607 to indicate completion of the handover (event 642). In a second option, adaptation function 607 sends a page response from UE 613 camped in RAN_A to VMM 605 to complete the paging of UE 613 (event 644). The devices continue with service setup and commence communications in RAN_A (block 646).

In either option shown in FIG. 6, core network signaling associated with events 634 or 642 are forwarded to VMM 605. The core network signaling forwarded to VMM 605 may be modelled as a response or paging response to complete the paging transaction. It is noted that 3GPP LTE supports the triggering of the handover in this scenario, e.g., using information element (IE) HandoverRestrictionList at an initial context setup, it is expected that 5G should as well.

In a situation wherein the UE is camped on both RAN_A and RAN_B at the same time and pages arrive on both RANs, a problem may arise if the UE responds to both pages. It may be possible that the UE is sufficiently knowledgeable and responds to only one of the two pages. Potentially, the UE may base a decision regarding which page to respond to according to a format of the pages, an order of arrival of the pages, a preference between RATs for the underlying service, etc. The multi-page problem may be a significant issue because the VMM may not know if the UE is capable of dual camping. One possible solution may be to use flood paging and if multiple page responses are received, the VMM can process the page responses individually, discard duplicates, and determine which page responses should result in a service establishment. This solution can result in lower latency at the cost of higher complexity in the VMM. Another possible solution may be to sequentially page the RANs, one at a time. The paging may be in order of preferred RANs, for example. As another example, the paging may also be in order of probability of UE location. As an illustrative example, the first page may be sent on a RAN with the highest probability that the UE is currently located, e.g., the RAN that has the most recent messages from the UE. The sequential paging solution may have higher latency but it is simpler to implement, e.g., the VMM can stop once a page response is received. The paging may be with or without redirection, depending upon the capabilities of the RANs and the UE.

Figure 7:
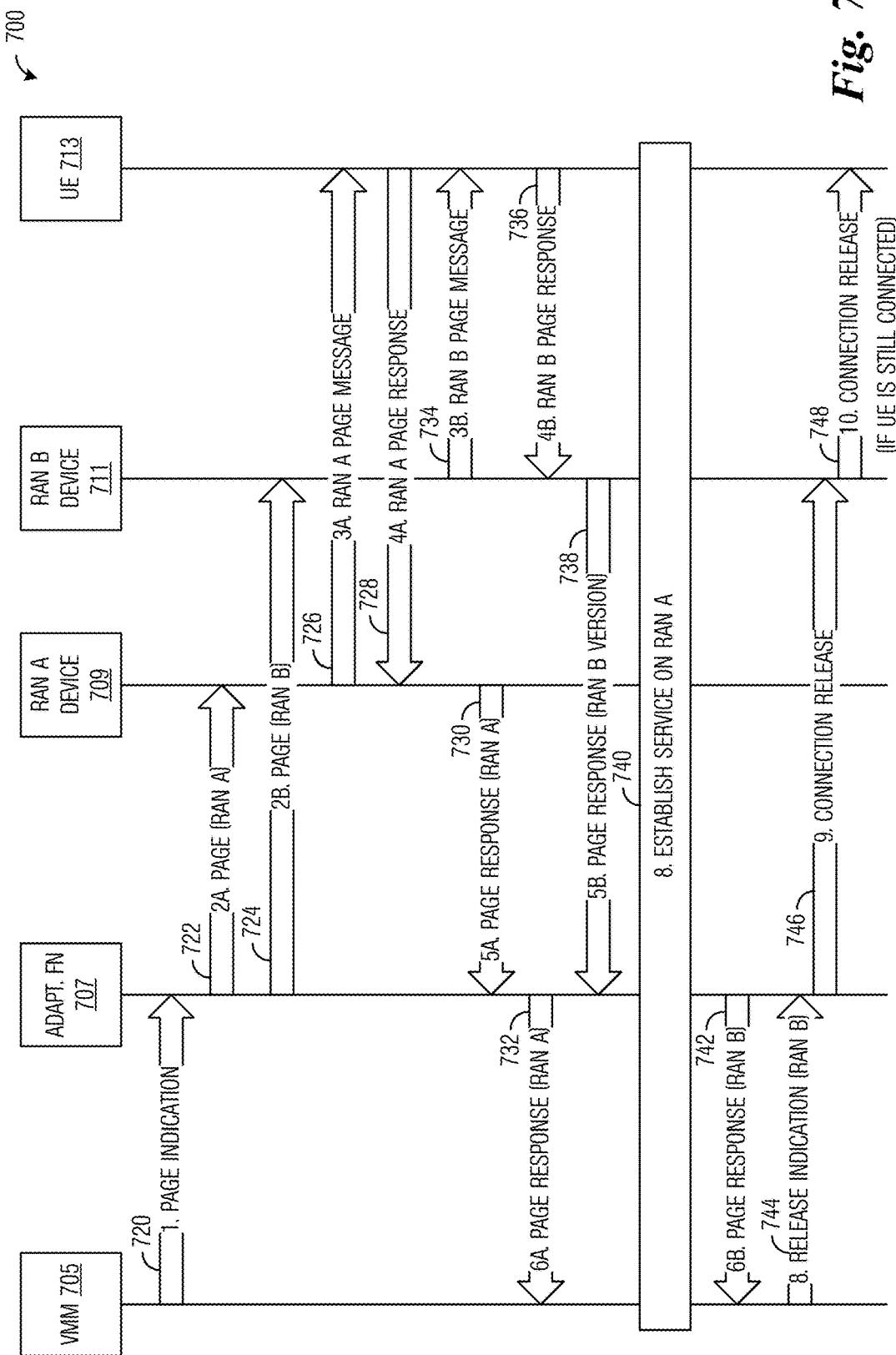
FIG. 7 illustrates a diagram highlighting messages exchanged and processing performed by devices participating in access selection with the capability to resolve multiple page responses according to example embodiments described herein.

FIG. 7 illustrates a diagram 700 highlighting messages exchanged and processing performed by devices participating in access selection with the capability to resolve multiple page responses. Diagram 700 highlights messages exchanged and processing performed by a VMM 705, an adaptation function 707, a RAN_A device 709, a RAN_B device 711, and a UE 713. Adaptation function 707 may be implemented in an entity in the core network. Alternatively, adaptation function 707 may be implemented in a stand-alone device, as a distributed function in multiple network devices, and so on.

VMM 705 sends a page indication to adaptation function 707 (event 720). Adaptation function 707 sends a page in a RAN_A format to RAN_A device 709 (event 722) and a page in a RAN_B format to RAN_B device 711 (event 724). RAN_A device 709 sends a page message to UE 713 (event 726) and UE 713 sends a page response to RAN_A device 709 (event 728). RAN_A device 709 forwards the RAN_A page response to adaptation function 707 (event 730), which sends a page response for RAN_A to VMM 705 (event 732). RAN_B device 711 sends a page message to UE 713 (event 734) and UE 713 sends a page response to RAN_B device 711 (event 736). RAN_B device 711 forwards the RAN_B page response to adaptation function 707 (event 738). The devices participate in establishing a service on RAN_A (block 740). Adaptation function 707 sends a page response for RAN_B to VMM 705 (event 742). It should be appreciated that event 740 may occur substantially asynchronously with respect to activity on RAN_B, e.g., with respect to events 734, 736, 738, and 742. For example, establishing service on RAN_A may begin before the reception of a page response on RAN_B.

In general, if a page results in multiple responses, multiple instances of the service should not be established. Therefore, because the service on RAN_A has already been established, VMM 705 sends a release indication for RAN_B to adaptation function 707 (event 744). Adaptation function 707 sends a connection release for RAN_B to RAN_B device 711 (event 746), which sends a connection release to UE 713 (event 748) if UE 713 is still connected in RAN_B. If RAN_B is a cellular based RAN, the connection release in event 748 may comprise the release of an RRC connection of the UE with RAN_B. If RAN_B is a Wi-Fi based RAN, the connection release in event 748 may comprise the RAN_B device sending IEEE 802.11 management frame(s) to de-authenticate or dis-associate UE 713, or to put UE 713 in a power save mode while maintaining the association with UE 713. Examples of such IEEE 802.11 management frames may include the IEEE 802.11 defined Deauthentication frame, Disassociation frame, Wireless Network Management (WNM) Sleep Mode Response frame, etc.

In some situations, one or more of the plurality of RANs is not 3GPP LTE or 5G or any other similarly capable RAN. As an example, one or more of the plurality of RANs is Wi-Fi or 3G. As long as paging is supported in the particular RAN, the UE can be paged through the RAN. It is noted that Wi-Fi does not support paging per se. However, Wi-Fi supports the use of a beacon frame to establish contact and start exchanging data with a UE that is operating in a power save mode, resulting in functionality similar to paging in cellular networks. Similarly, 3G cellular systems support paging, while millimeter wave (mmWave) systems may be a different variant of 5G potentially including a differently defined paging procedure. The basic procedures described earlier are operable with such RANs, with adaptations as needed.

According to an example embodiment, in a situation where a page for a UE that may be camped in a plurality of RANs is received, and when at least one of the RANs is not 3GPP LTE or 5G or any other similarly capable RAN, pages are sent in each RAN in the plurality of RANs. If the RAN(s) that are not 3GPP LTE or 5G or any other similarly capable RANs, and do not support paging, techniques that are functionally similar to paging are used. As an illustrative example, if one of the RANs is Wi-Fi, then beacon frames are used in place of pages to contact UEs that are operating in a power save mode.

Figure 8:
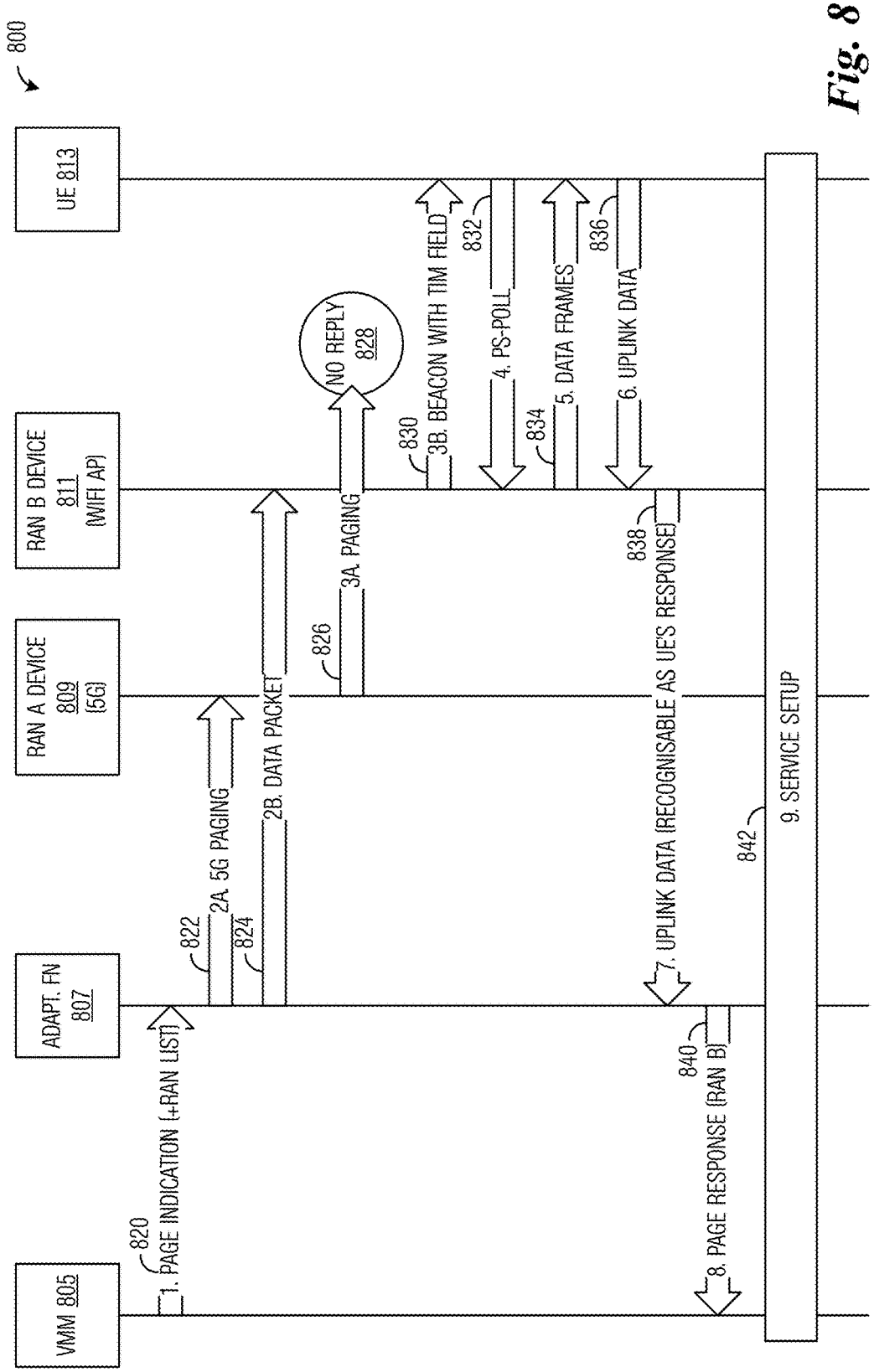
FIG. 8 illustrates a diagram highlighting messages exchanged and processing performed by devices participating in access selection with 5G and Wi-Fi RANs according to example embodiments described herein.

FIG. 8 illustrates a diagram 800 highlighting messages exchanged and processing performed by devices participating in access selection with 5G and Wi-Fi RANs. Diagram 800 highlights messages exchanged and processing performed by a VMM 805, an adaptation function 807, a RAN_A device 809 (e.g., a 5G gNB), a RAN_B device 811 (e.g., a Wi-Fi AP), and a UE 813. Adaptation function 807 may be implemented in an entity in the core network. Alternatively, adaptation function 807 may be implemented in a stand-alone device, as a distributed function in multiple network devices, and so on.

VMM 805 sends a page indication to adaptation function 807 (event 820). Adaptation function 807 generates and sends a page in a RAN_A format to RAN_A device 809 (event 822). However, RAN_B (the Wi-Fi RAN) does not support paging. Instead, beacon frames are used to contact UEs that are operating in a power save mode when downlink data is present for the UE. Adaptation function 807 sends an Ethernet frame including a downlink data packet to RAN_B device 811 (event 824). The downlink data packet may be the packet data that triggered the page in event 820. Alternatively, the downlink data packet may be a protocol data unit generated by adaptation function 807 serving the function of paging. RAN_B device 811 may convert the Ethernet frame into a RAN_B format frame, e.g., an IEEE 802.11 data frame.

RAN_A device 809 sends a page message to UE 813 (event 826) and no reply is received because UE 813 is camped in RAN_B (event 828). Page message sent by RAN_A device 809 may contain redirection information towards RAN_B. Otherwise, if UE 813 responds to the 5G page, UE 813 will have to subsequently handover to RAN_B.

The arrival of the converted data frame at a transmission queue of RAN_B device 811 triggers RAN_B device 811 to send a beacon frame with a traffic indication map (TIM) set to indicate that there is a downlink data frame buffered at RAN_B device 811 for UE 813 (event 830). UE 813 sends back a power save poll (PS-Poll) frame to indicate that UE 813 is ready to receive the downlink data (event 832). RAN_B device 811 sends the downlink data frame to UE 813 (event 834) and UE 813 sends uplink data frame to RAN_B device 811 (event 836). The uplink data frame may include an uplink data packet that UE 813 generates in response to the downlink data packet. For example, if the downlink data packet contains a Transmission Control Protocol (TCP) data segment, the uplink data packet may contain a TCP acknowledgement (ACK) segment. As another example, if the downlink data packet contains a protocol data unit generated by adaptation function 807 serving the function of paging, the uplink data packet may contain another protocol data unit generated by UE 813 serving the function of paging acknowledgement. Therefore, the uplink data packet may be used as an indication of the page response of UE 813. RAN_B device 811 extracts the uplink data packet from the uplink data frame and sends an Ethernet frame including the uplink data packet to adaptation function 807 (event 838). Adaptation function 807 sends a page response for RAN_B to VMM 805 (event 840). As long as adaptation function 807 is able to recognize the uplink data from UE 813 as a page response, adaptation function 807 will be able to generate the page response for RAN_B and forward the page response to VMM 805. The devices participate in service setup (block 842).

Figure 9:
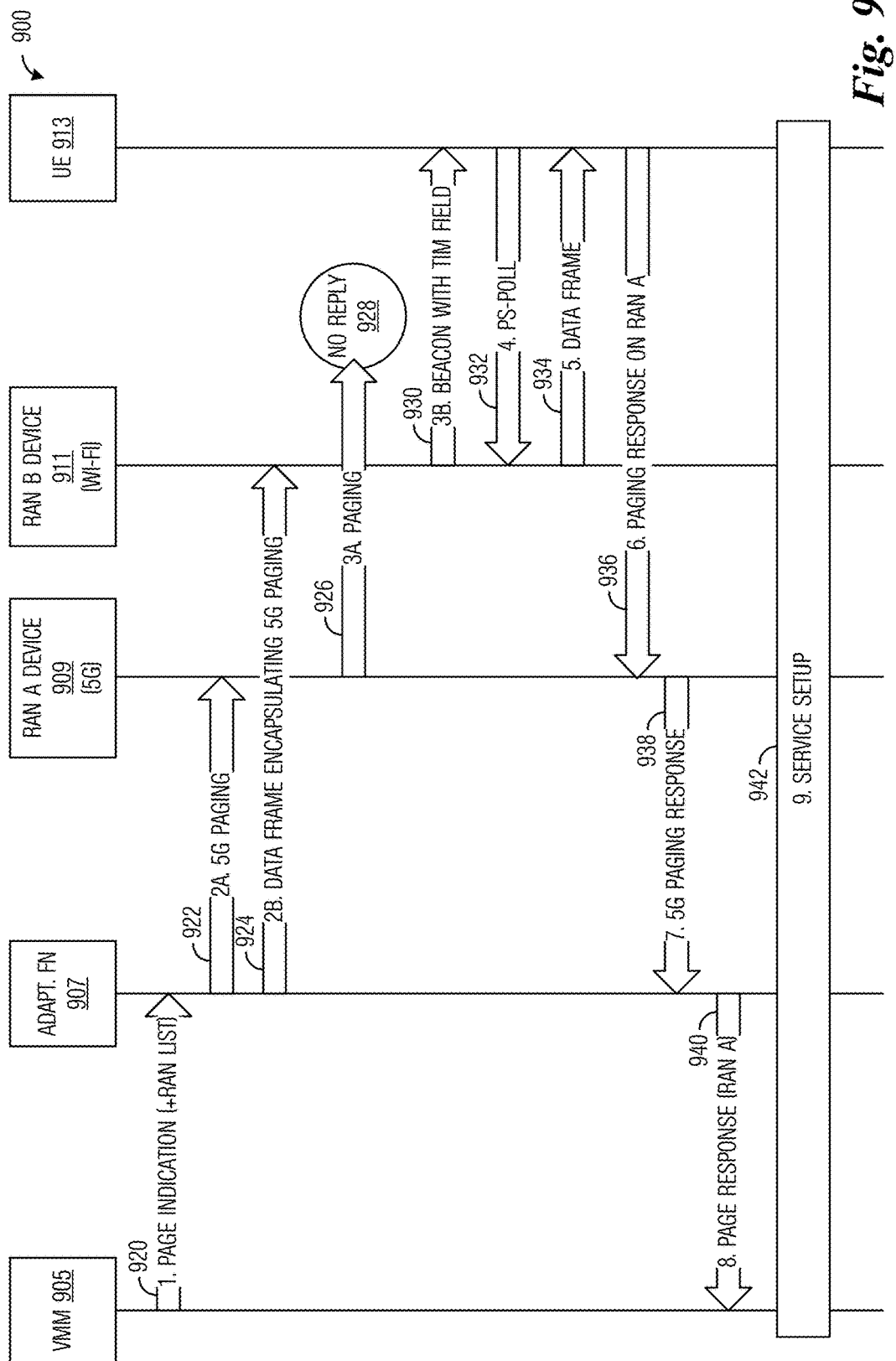
FIG. 9 illustrates a diagram highlighting messages exchanged and processing performed by devices participating in access selection with 5G and Wi-Fi RANs, where 5G is the preferred RAN according to example embodiments described herein.

FIG. 9 illustrates a diagram 900 highlighting messages exchanged and processing performed by devices participating in access selection with 5G and Wi-Fi RANs, where 5G is the preferred RAN. Diagram 900 highlights messages exchanged and processing performed by a VMM 905, an adaptation function 907, a RAN_A device 909 (e.g., a 5G gNB), a RAN_B device 911 (e.g., a Wi-Fi access point (AP)), and a UE 913. Adaptation function 907 may be implemented in an entity in the core network. Alternatively, adaptation function 907 may be implemented in a stand-alone device, as a distributed function in multiple network devices, and so on.

VMM 905 sends a page indication to adaptation function 907 (event 920). Adaptation function 907 generates and sends a page in a RAN_A format to RAN_A device 909 (event 922). Adaptation function 907 generates and sends a downlink Ethernet data frame targeted for UE 913 and encapsulating a 5G page (or alternatively, 5G paging information) to RAN_B device 911 (event 924). RAN_B device 911 may convert the downlink Ethernet data frame into a RAN_B format frame, e.g., an IEEE 802.11 data frame. If the downlink data frame includes frequency information for RAN_A, the frequency information may be used to redirect UE 913 to RAN_A. UE 913 can transmit a page response over the air to RAN_A device 909, as shown below. If the frequency information is not available or if the redirection feature is not available, the page response from UE 913 can occur over RAN_B followed with a handover to RAN_A.

RAN_A device 909 sends a page message to UE 913 (event 926) and no reply is received because UE 913 is camped in RAN_B (circle 928). The arrival of the converted data frame at a transmission queue of RAN_B device 911 triggers RAN_B device 911 to send a beacon frame with a TIM set to indicate that there is a downlink data frame buffered at RAN_B device 911 for UE 913 (event 930). UE 913 sends back a PS-Poll frame to indicate that UE 913 is ready to receive the downlink data frame (event 932). RAN_B device 911 sends the downlink data frame to UE 913 (event 934). Because the downlink data frame includes the 5G page, UE 913 sends a 5G page response on RAN_A to RAN_A device 909 (event 936). RAN_A device 909 sends the 5G page response to adaptation function 907 (event 938). Adaptation function 907 sends a page response for RAN_A to VMM 905 (event 940). The devices participate in service setup (block 942).

As an illustrative example of the operations shown in FIG. 9, an adaptation function (or a RAN_A (e.g., 5G) device) sends an Ethernet frame to a RAN_B (e.g., Wi-Fi) device with an EtherType field containing value "89-0d" (expressed in hexadecimal), a Payload Type field containing a defined value to represent 5G paging (e.g., a value of "5"), a Payload field (such as payload field 1005 in FIG. 10A) containing a 5G paging message, and the Destination MAC field (such as destination MAC field 1010 in FIG. 10A) set to the MAC address of the UE. FIG. 10A illustrates an example Ethernet frame 1000.

The RAN_B device recognizes the value in the Destination MAC as belonging to a station associated with the RAN_B device, the RAN_B device converts the Ethernet frame to a logical link control (LLC) Protocol Discrimination based data frame (which is needed for transmission over Wi-Fi) before sending the information to the UE. FIG. 10B illustrates an example LLC Protocol Discrimination based data frame 1020. The LLC field is defined in ISO/IEC 8802-2:1998. The subnetwork access protocol (SNAP) field is defined in IEEE 802.2014. The format of the SNAP header is according to IETF RFC 1042. The EtherType value within the SNAP header may be copied from the EtherType field of the Ethernet frame received from the adaptation function. The Payload Type (such as Payload Type field 1025) and Payload fields (such as Payload field 1030) may be copied from the Payload field (e.g., Payload field 1005) of the Ethernet frame.

Based on EtherType "89-0d" in the SNAP header, the data port in the UE routes the data frame to the station management entity (SME), which further processes the Payload Type field (e.g., Payload Type field 1025). FIG. 10C illustrates a table 1040 of example Payload Type values. The Payload Type is used by the UE to select a corresponding protocol handler for processing the Payload field (e.g., Payload field 1030). For the Payload Type value representing 5G paging, the SME forwards the content of the Payload field (e.g., Payload field 1030) to the 5G paging protocol hander for further processing.

Figure 11:
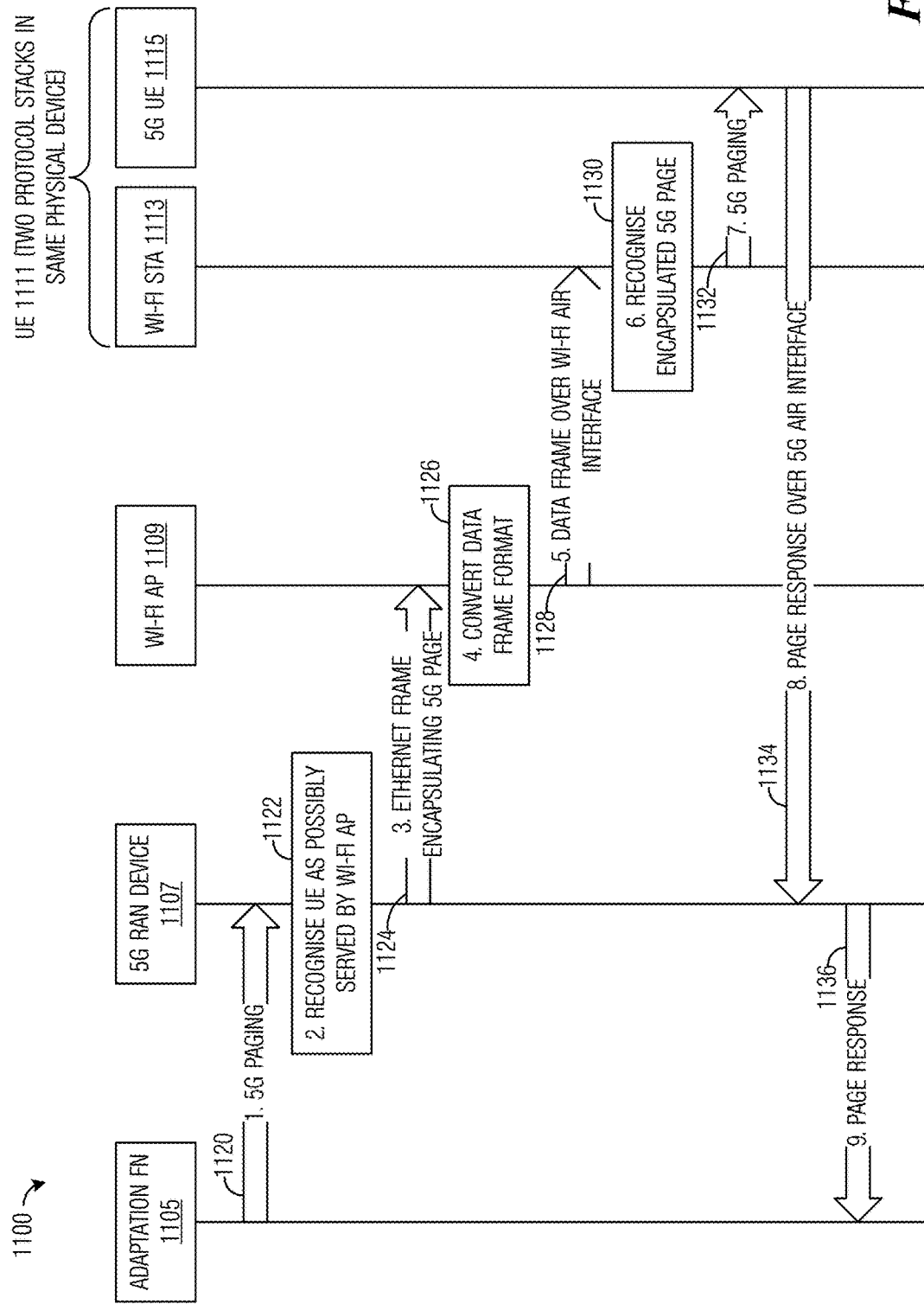
FIG. 11 illustrates a diagram highlighting messages exchanged and processing performed by devices participating in access selection with 5G and Wi-Fi RANs, where a 5G page is routed through Wi-Fi according to example embodiments described herein.

FIG. 11 illustrates a diagram 1100 highlighting messages exchanged and processing performed by devices participating in access selection with 5G and Wi-Fi RANs, where a 5G page is routed through Wi-Fi. Diagram 1100 highlights messages exchanged and processing performed by an adaptation function 1105, a 5G RAN device 1107, a Wi-Fi access point 1109, and a UE 1111 with two protocol stacks (a Wi-Fi station protocol stack 1113 and a 5G UE protocol stack 1115).

Adaptation function 1105 sends a 5G page to 5G RAN device 1107 (event 1120). 5G RAN device 1107 determines that UE 1111 may be served by Wi-Fi AP 1109 (block 1122). 5G RAN device 1107 generates and sends an Ethernet frame encapsulating the 5G page to Wi-Fi AP 1109 (event 1124). Wi-Fi AP 1109 converts the format of the Ethernet frame into a LLC Protocol Discrimination based data frame, such as LLC Protocol Discrimination based data frame 1020 of FIG. 10B (block 1126). Wi-Fi AP 1109 sends the LLC Protocol Discrimination based data frame over the Wi-Fi air interface to UE 1111 (event 1128). Wi-Fi station protocol stack 1113 processes the LLC Protocol Discrimination based data frame and recognizes the EtherType "89-0d" frame and the encapsulated 5G page included therein (block 1130). Wi-Fi station protocol stack 1113 sends the 5G page to 5G UE protocol stack 1115 (event 1132). 5G UE protocol stack 1115 sends a page response over the 5G air interface to 5G RAN device 1107 (event 1134). 5G RAN device 1107 sends a page response for the 5G RAN to adaptation function 1105 (event 1136).

The procedure illustrated in FIG. 11 assumes that 5G paging supports some form of page with redirection. In other words, the paging message includes information about a target frequency and/or RAN. At a minimum, the paging message should include information to provide the UE sufficient information about the carrier that the UE will redirect to, in this case a 5G carrier. This is somewhat similar to frequency redirection in an Extended Channel Assignment Message in CDMA2000, wherein a target carrier frequency is included. The Wi-Fi protocol stack routes the message to the 5G protocol stack, which would then treat the message as if it had received the message on the 5G air interface. A more feature-rich version may allow the page record to indicate redirection to other systems, e.g., a page on the 5G RAN with redirection to Wi-Fi, LTE, etc.

According to an example embodiment, the Ethernet frame format for encapsulating the 5G page may be generated by a RAN_A (e.g., 5G) device, such as a 5G base station, instead of an adaptation function. If the encapsulating is performed by the RAN_A device, the Wi-Fi AP is not exposed to the adaptation function and/or core network. However, the RAN_A device would need to know the identifiers of the UEs served by the RAN_B (e.g., Wi-Fi) AP, as well as how to translate the identifiers to a destination MAC address for RAN_B.

It is noted that not all RANs, e.g., Wi-Fi, can truly support redirection. If a UE responds on Wi-Fi for a service that prefers 5G, the UE may be stuck using Wi-Fi for the service. This is due to the fact that there is currently no mechanism for a 3GPP core network to force a handoff from Wi-Fi to LTE. The Wi-Fi offload rules may not be sufficiently dynamic. Therefore, a service that has a strong preference for a particular RAN will not likely work well when the UE is paged into service on Wi-Fi.

Paging is only one procedure. In order to get to the paging procedure, the UE had to attach to the core network through Wi-Fi or some other RAN. A "radio as a service" (RaaS) scheme like this may work for systems that meet the requirements of the service. In principle that the example embodiments presented herein may work with non-3GPP RATs, but the interworking requirements may need to be developed in parallel with the SDN interfaces. The technique presented to deliver 5G paging over Wi-Fi as a management frame or a data frame with an encapsulation illustrates such an approach.

Figures 12, 13:
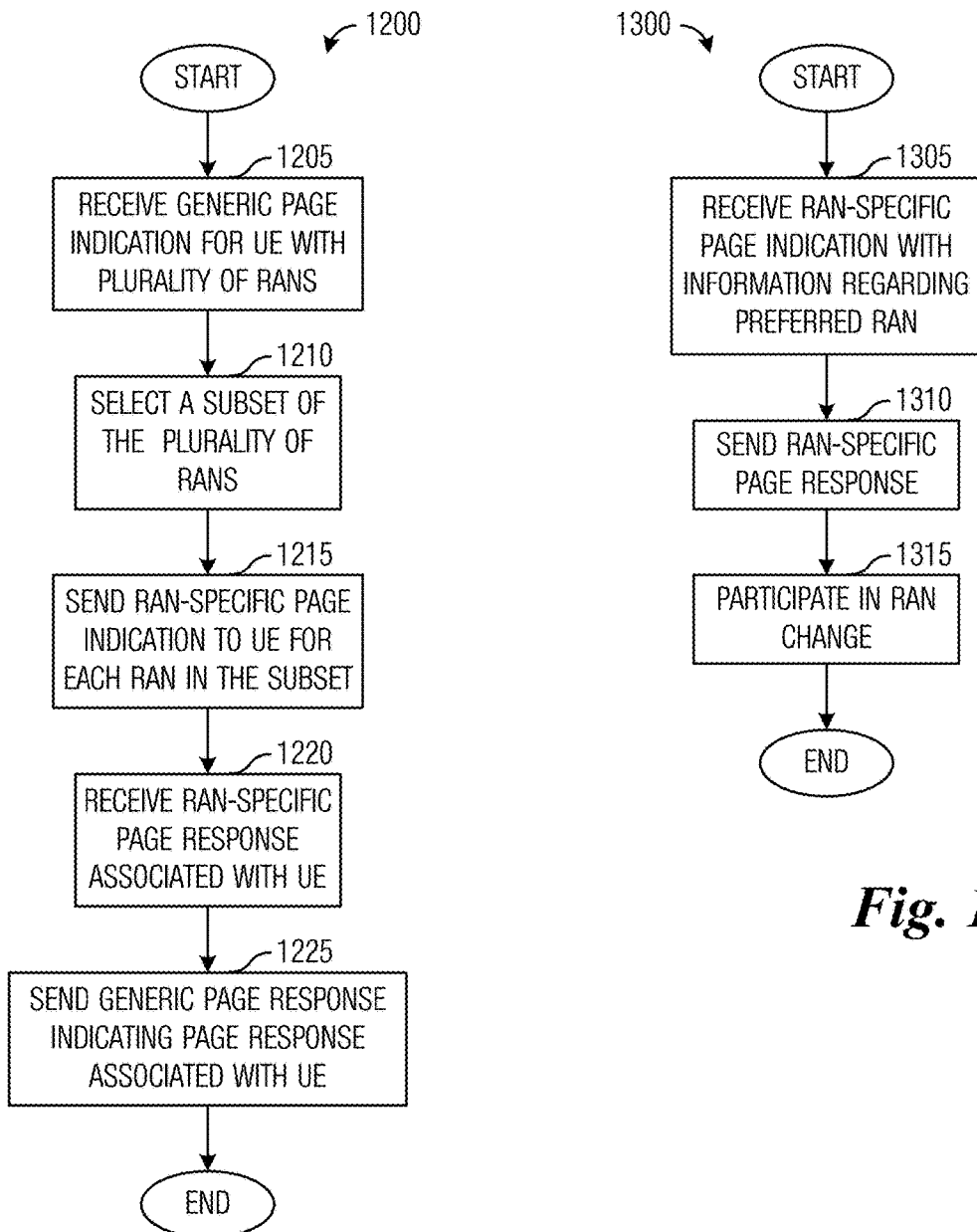
FIG. 12 illustrates a flow diagram of example operations occurring in an adaptation function participating in flood paging according to example embodiments described herein.
FIG. 13 illustrates a flow diagram of example operations occurring in a UE participating in flood paging according to example embodiments described herein.

FIG. 12 illustrates a flow diagram of example operations 1200 occurring in an adaptation function participating in flood paging. Operations 1200 may be indicative of operations occurring in an adaptation function as the adaptation function participates in flood paging.

Operations 1200 begin with the adaptation function receiving a generic page indication for a UE (block 1205). The generic page indication may be received from a VMM. The generic page indication may include a list of RANs associated with the UE. The adaptation function selects a subset of the list of RANs (block 1210). In an example embodiment, the subset comprises all RANs in the list of RANs. In another example embodiment, the subset comprises a single RAN in the list of RANs. In yet another example embodiment, the subset comprises two or more RANs in the list of RANs. The adaptation function generates and sends a RAN-specific page indication to each RAN in the subset of RANs (block 1215). The RAN-specific page indications may include information about a preferred RAN for a service being setup by the page. The adaptation function receives at least one RAN-specific page response associated with a page response from the UE (block 1220). Alternatively, the at least one RAN-specific page responses may be received from the preferred RAN as indicated in the RAN-specific page indications. The at least one RAN-specific page responses may be received from one or more of the RANs in the subset of RANs. The adaptation function generates and sends a generic page response to the VMM (block 1225). The generic page response corresponds to and indicates the at least one RAN-specific page response associated with the page response from the UE. If the adaptation function receives more than one RAN-specific page response, the adaptation function may select one RAN-specific page response to generate the generic page response. The selection of the one RAN-specific page response may be based upon one or more selection criteria, such as a preferred RAN for a service being setup, a preferred RAN for the UE, RAN capabilities, UE capabilities, RAN condition, UE condition, and so on.

FIG. 13 illustrates a flow diagram of example operations 1300 occurring in a UE participating in flood paging. Operations 1300 may be indicative of operations occurring in a UE as the UE participates in flood paging.

Operations 1300 begin with the UE receiving a RAN-specific page indication (block 1305). The RAN-specific page indication may be received from a RAN device operating in the RAN associated with the RAN-specific page indication. The RAN-specific page indication may include information regarding a preferred RAN for a service being setup by the page. The UE sends a RAN-specific page response (block 1310). The RAN-specific page response may be sent to the same RAN device that sent the RAN-specific page indication. The UE participates in a RAN change (block 1315). The UE may participate in a redirection to change from a current RAN to the preferred RAN. Alternatively, the UE may participate in a handover to change from the current RAN to the preferred RAN.

Figures 14, 15:
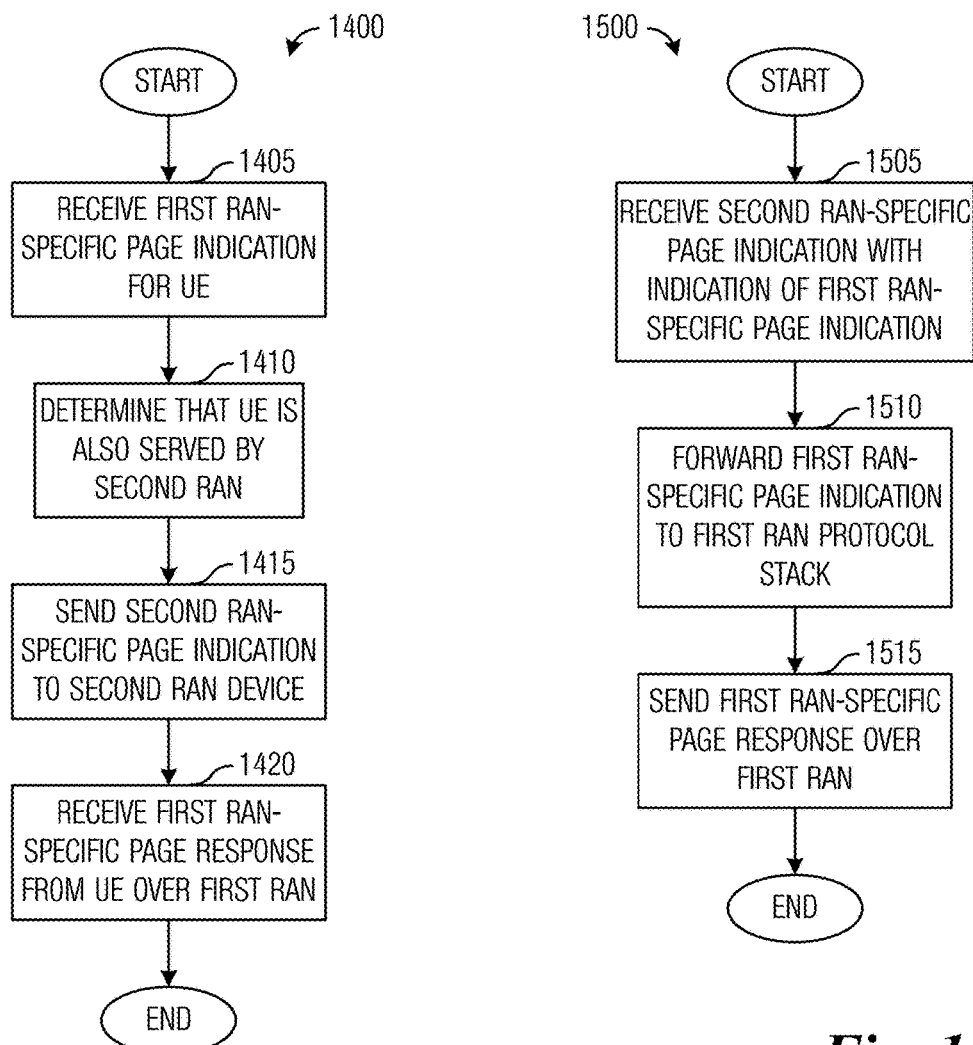
FIG. 14 illustrates a flow diagram of example operations occurring in a first RAN device participating in paging by routing a page through an alternate RAN according to example embodiments described herein.
FIG. 15 illustrates a flow diagram of example operations occurring in a UE participating in paging by routing a page through an alternate RAN according to example embodiments described herein.

FIG. 14 illustrates a flow diagram of example operations 1400 occurring in a first RAN device participating in paging by routing a page through an alternate RAN. Operations 1400 may be indicative of operations occurring in a first RAN device as the first RAN device participates in paging a UE by routing a page through an alternate RAN.

Operations 1400 begin with the first RAN device receiving a first RAN-specific page indication for the UE (block 1405). The first RAN device determines that the UE may be camped in a second RAN (block 1410). The first RAN device generates and sends a second RAN-specific page indication (block 1415). The second RAN-specific page indication includes the first RAN-specific indication or information included therein. As an example, the second RAN-specific page indication includes an encapsulated first RAN-specific page indication. As another example, the second RAN-specific page indication includes the information included in the first RAN-specific page indication in encapsulated form. The second RAN-specific page indication is sent to a second RAN device by the first RAN device. The second RAN-specific page indication may trigger the second RAN device to send a paging message to the UE on the second RAN. The first RAN device receives a first RAN-specific page response from the UE (block 1420). The first RAN-specific page response is received over the first RAN.

FIG. 15 illustrates a flow diagram of example operations 1500 occurring in a UE participating in paging by routing a page through an alternate RAN. Operations 1500 may be indicative of operations occurring in a UE as the UE participates in paging by routing a page through an alternate RAN.

Operations 1500 begin with the UE receiving a second RAN-specific page indication (block 1505). The second RAN-specific page indication is received from a second RAN device. The second RAN-specific page indication includes a first RAN-specific page indication or information included in the first RAN-specific page indication, the first RAN-specific page indication or the information is in encapsulated form, for example. The UE forwards the first RAN-specific page indication or the information to a first RAN protocol stack in the UE (block 1510). The first RAN-specific page indication or the information is forwarded from a second RAN protocol stack of the UE to the first RAN protocol stack in the UE. The UE sends a first RAN-specific page response (block 1515). The first RAN-specific page response is sent over the first RAN to a first RAN device.

Figure 16:
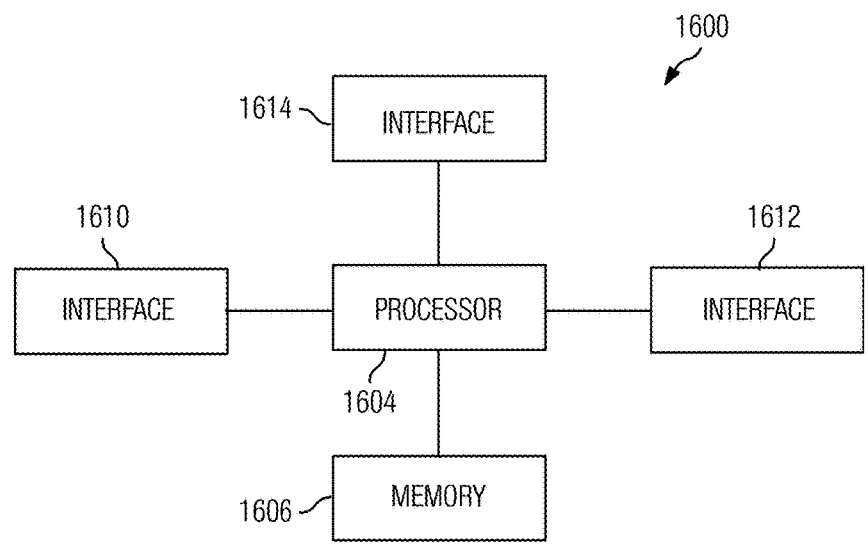
FIG. 16 illustrates a block diagram of an embodiment processing system for performing methods described herein.

FIG. 16 illustrates a block diagram of an embodiment processing system 1600 for performing methods described herein, which may be installed in a host device. As shown, the processing system 1600 includes a processor 1604, a memory 1606, and interfaces 1610-1614, which may (or may not) be arranged as shown in FIG. 16. The processor 1604 may be any component or collection of components adapted to perform computations and/or other processing related tasks, and the memory 1606 may be any component or collection of components adapted to store programming and/or instructions for execution by the processor 1604. In an embodiment, the memory 1606 includes a non-transitory computer readable medium. The interfaces 1610, 1612, 1614 may be any component or collection of components that allow the processing system 1600 to communicate with other devices/components and/or a user. For example, one or more of the interfaces 1610, 1612, 1614 may be adapted to communicate data, control, or management messages from the processor 1604 to applications installed on the host device and/or a remote device. As another example, one or more of the interfaces 1610, 1612, 1614 may be adapted to allow a user or user device (e.g., personal computer (PC), etc.) to interact/communicate with the processing system 1600. The processing system 1600 may include additional components not depicted in FIG. 16, such as long term storage (e.g., non-volatile memory, etc.).

In some embodiments, the processing system 1600 is included in a network device that is accessing, or part otherwise of, a telecommunications network. In one example, the processing system 1600 is in a network-side device in a wireless or wireline telecommunications network, such as a base station, a relay station, a scheduler, a controller, a gateway, a router, an applications server, or any other device in the telecommunications network. In other embodiments, the processing system 1600 is in a user-side device accessing a wireless or wireline telecommunications network, such as a mobile station, a user equipment (UE), a personal computer (PC), a tablet, a wearable communications device (e.g., a smartwatch, etc.), or any other device adapted to access a telecommunications network.

Figure 17:
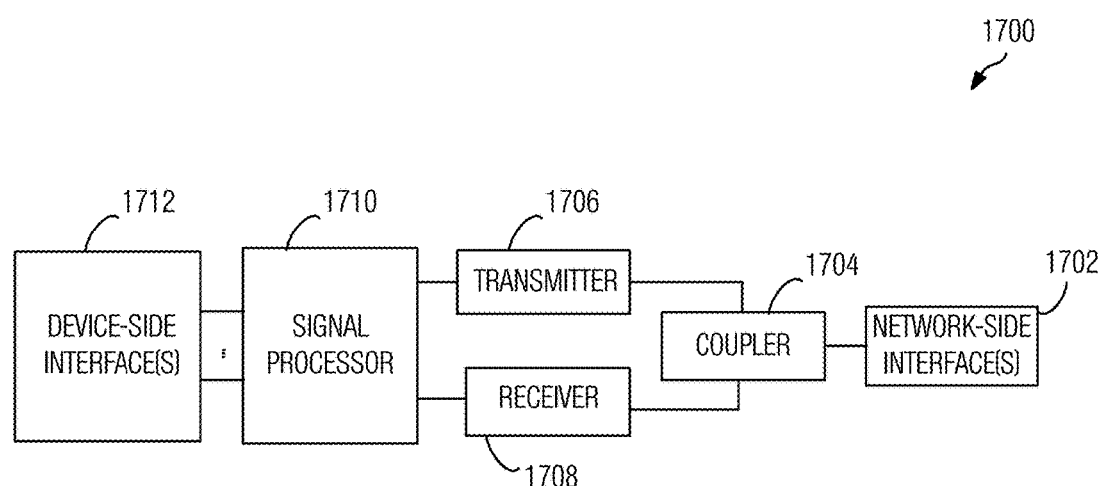
FIG. 17 illustrates a block diagram of a transceiver adapted to transmit and receive signaling over a telecommunications network according to example embodiments described herein.

In some embodiments, one or more of the interfaces 1610, 1612, 1614 connects the processing system 1600 to a transceiver adapted to transmit and receive signaling over the telecommunications network. FIG. 17 illustrates a block diagram of a transceiver 1700 adapted to transmit and receive signaling over a telecommunications network. The transceiver 1700 may be installed in a host device. As shown, the transceiver 1700 comprises a network-side interface 1702, a coupler 1704, a transmitter 1706, a receiver 1708, a signal processor 1710, and a device-side interface 1712. The network-side interface 1702 may include any component or collection of components adapted to transmit or receive signaling over a wireless or wireline telecommunications network. The coupler 1704 may include any component or collection of components adapted to facilitate bi-directional communication over the network-side interface 1702. The transmitter 1706 may include any component or collection of components (e.g., up-converter, power amplifier, etc.) adapted to convert a baseband signal into a modulated carrier signal suitable for transmission over the network-side interface 1702. The receiver 1708 may include any component or collection of components (e.g., down-converter, low noise amplifier, etc.) adapted to convert a carrier signal received over the network-side interface 1702 into a baseband signal. The signal processor 1710 may include any component or collection of components adapted to convert a baseband signal into a data signal suitable for communication over the device-side interface(s) 1712, or vice-versa. The device-side interface(s) 1712 may include any component or collection of components adapted to communicate data-signals between the signal processor 1710 and components within the host device (e.g., the processing system 1600, local area network (LAN) ports, etc.).

The transceiver 1700 may transmit and receive signaling over any type of communications medium. In some embodiments, the transceiver 1700 transmits and receives signaling over a wireless medium. For example, the transceiver 1700 may be a wireless transceiver adapted to communicate in accordance with a wireless telecommunications protocol, such as a cellular protocol (e.g., long-term evolution (LTE), etc.), a wireless local area network (WLAN) protocol (e.g., Wi-Fi, etc.), or any other type of wireless protocol (e.g., Bluetooth, near field communication (NFC), etc.). In such embodiments, the network-side interface 1702 comprises one or more antenna/radiating elements. For example, the network-side interface 1702 may include a single antenna, multiple separate antennas, or a multi-antenna array configured for multi-layer communication, e.g., single input multiple output (SIMO), multiple input single output (MISO), multiple input multiple output (MIMO), etc. In other embodiments, the transceiver 700 transmits and receives signaling over a wireline medium, e.g., twisted-pair cable, coaxial cable, optical fiber, etc. Specific processing systems and/or transceivers may utilize all of the components shown, or only a subset of the components, and levels of integration may vary from device to device.

It should be appreciated that one or more steps of the embodiment methods provided herein may be performed by corresponding units or modules. For example, a signal may be transmitted by a transmitting unit or a transmitting module. A signal may be received by a receiving unit or a receiving module. A signal may be processed by a processing unit or a processing module. Other steps may be performed by a selecting unit/module, a RAN change unit/module, a determining unit/module, and/or a forwarding unit/module. The respective units/modules may be hardware, software, or a combination thereof. For instance, one or more of the units/modules may be an integrated circuit, such as field programmable gate arrays (FPGAs) or application-specific integrated circuits (ASICs).

Although the present disclosure and its advantages have been described in detail, it should be understood that various changes, substitutions and alterations can be made herein without departing from the spirit and scope of the disclosure as defined by the appended claims.

What is claimed is:

1. A method for paging a user equipment (UE), the method comprising:
   receiving, by a network device, a generic page indication for the UE, the generic page indication including a list of radio access networks (RANs);
   selecting, by the network device, a subset of the list of RANs;

sending, by the network device, a RAN-specific page indication for each RAN in the subset of the list of RANs;

receiving, by the network device, a first RAN-specific page response associated with the UE;

converting, by the network device, the first RAN-specific page response into a generic page response; and sending, by the network device, the generic page response.

2. The method of claim 1, wherein at least two RANs in the list of RANs operate using distinct radio access technologies (RATs).

3. The method of claim 1, wherein the network device receives a plurality of RAN-specific page responses including the first RAN-specific page response associated with the UE, and wherein the method further comprises selecting, by the network device, the first RAN-specific page response from the plurality of RAN-specific page responses in accordance with a selection criteria.

4. The method of claim 3, wherein the selection criteria includes at least one of a preferred RAN for a service being setup by the generic page indication, a preferred RAN for the UE, RAN capabilities, UE capabilities, RAN condition, or UE condition.

5. The method of claim 1, wherein the generic page indication is associated with a service with a preferred RAN, and wherein the subset of the list of RANs is selected in accordance with the preferred RAN.

6. The method of claim 5, wherein at least one of the RAN-specific page indications include information to direct the UE to the preferred RAN.

7. The method of claim 5, wherein at least a first RAN-specific page indication of the RAN-specific page indications includes a data frame encapsulating a second RAN-specific page indication associated with the preferred RAN or RAN-specific information associated with the preferred RAN.

8. The method of claim 1, wherein the network device receives a plurality of RAN-specific page responses including the first RAN-specific page response associated with the UE, and wherein the method further comprises sending, by the network device, to RAN devices associated with the plurality of RAN-specific page responses other than the first RAN-specific page response, RAN-specific messages indicating the RAN devices to release the UE.

9. A method for operating a user equipment (UE), the method comprising:

receiving, by a first wireless protocol stack in the UE, a first radio access network (RAN)-specific page indication from a first RAN device, the first RAN-specific page indication encapsulating a second RAN-specific page and including information regarding a preferred RAN;

forwarding, by the first wireless protocol stack in the UE to a second wireless protocol stack in the UE, the second RAN-specific page;

sending, by the second wireless protocol stack in the UE, a second RAN-specific page response to a second RAN device; and participating, by the UE, in a RAN change in accordance with the first RAN-specific page indication.

10. The method of claim 9, wherein the first RAN-specific page indication includes a redirection indicator, and wherein participating in the RAN change comprises redirecting to the preferred RAN.

11. The method of claim 9, wherein the first RAN-specific page indication includes a handover indicator, and wherein participating in the RAN change comprises performing a handover to the preferred RAN.

12. The method of claim 9, wherein the first RAN device and the second RAN device are one and the same.

13. The method of claim 9, wherein the first RAN device and the second RAN device are different RAN devices, wherein the second RAN device serves the preferred RAN, and wherein the second RAN-specific page is associated with the preferred RAN.

14. The method of claim 13, wherein the first RAN-specific page indication comprises a logical link control (LLC) Protocol Discrimination (LPD) based data frame with an EtherType field indicating that the LPD based data frame is an EtherType "89-0d" frame, wherein the second RAN-specific page associated with the preferred RAN is encapsulated in a payload of the LPD based data frame, and wherein a payload type indicator of the LPD based data frame indicates a paging protocol of the preferred RAN, the method further comprising:

obtaining, by the UE, the payload type indicator and the payload of the LPD based data frame from the first RAN-specific page indication, the forwarding to the second wireless protocol stack based on a value of the payload type indicator.

15. A method for paging a user equipment (UE), the method comprising:

receiving, by a first radio access network (RAN) device serving a first RAN, a first RAN-specific page indication instructing the first RAN device to transmit a first RAN-specific page to the UE over a first radio access technology of the first RAN;

determining, by the first RAN device, that the UE is camped on a second RAN, the first and second RANs using different radio access technologies from each other;

sending, by the first RAN device, a second RAN-specific page indication to a second RAN device serving the second RAN, the second RAN-specific page indication including the first RAN-specific page; and receiving, by the first RAN device, a first RAN-specific page response from the UE.

16. The method of claim 15, wherein the first RAN-specific page indication is encapsulated in the second RAN-specific page indication.

17. The method of claim 15, wherein the second RAN-specific page indication comprises a data frame.

18. The method of claim 15, further comprising forwarding, by the first RAN device, the first RAN-specific page response from the UE to a network device, wherein the first RAN-specific page indication for the UE is received from the network device.

19. A user equipment (UE) comprising:

a non-transitory memory storage comprising instructions; and one or more processors in communication with the memory storage, wherein the one or more processors execute the instructions to:

receive, by a first wireless protocol stack, a first radio access network (RAN)-specific page indication from a first RAN device, the first RAN-specific page indication encapsulating a second RAN-specific page and including information regarding a preferred RAN, forward, by the first wireless protocol stack to a second wireless protocol stack, the second RAN-specific page, send, the second wireless protocol stack, a second RAN-specific page response to a second RAN device, and participate in a RAN change in accordance with the first RAN-specific page indication.

20. The UE of claim 19, wherein the first RAN-specific page indication includes a redirection indicator, and wherein the one or more processors execute the instructions to redirect to the preferred RAN.

21. The UE of claim 19, wherein the first RAN-specific page indication includes a handover indicator, and wherein the one or more processors execute the instructions to perform a handover to the preferred RAN.

* * * * *